(12) United States Patent
Liu

(10) Patent No.: US 11,248,303 B2
(45) Date of Patent: Feb. 15, 2022

(54) ELECTROCHEMICAL DEVICE COMPRISING THIN POROUS METAL SHEET

(71) Applicant: Molecule Works Inc., Richland, WA (US)

(72) Inventor: Wei Liu, Richland, WA (US)

(73) Assignee: Molecule Works Inc., Richland, WA (US)

( * ) Notice: Subject to any disclaimer, the term of this patent is extended or adjusted under 35 U.S.C. 154(b) by 344 days.

(21) Appl. No.: 16/398,468

(22) Filed: Apr. 30, 2019

(65) Prior Publication Data

US 2019/0376193 A1    Dec. 12, 2019

Related U.S. Application Data

(60) Provisional application No. 62/681,398, filed on Jun. 6, 2018.

(51) Int. Cl.
    *H01M 4/90* (2006.01)
    *H01M 2/16* (2006.01)
    (Continued)

(52) U.S. Cl.
    CPC .............. *C25B 11/031* (2021.01); *C25B 1/00* (2013.01); *C25B 1/04* (2013.01); *C25B 9/73* (2021.01);
    (Continued)

(58) Field of Classification Search
    CPC ............. H01M 8/1004; H01M 8/0236; H01M 4/9041; H01M 4/865; H01M 4/862;
    (Continued)

(56) References Cited

U.S. PATENT DOCUMENTS

| 4,636,291 A | 1/1987 | Divisek et al. |
| 7,314,544 B2 * | 1/2008 | Murphy .................... C25B 1/00 205/360 |

(Continued)

OTHER PUBLICATIONS

Vermeiren, et al., "Electrode diaphragm electrode assembly for alkaline water electrolyers", International Journal of Hydrogen Energy 34, Science Direct, pp. 9305-9315, (2009).

(Continued)

*Primary Examiner* — Alexander Usyatinsky
(74) *Attorney, Agent, or Firm* — The Marbury Law Group, PLLC

(57) ABSTRACT

Electrochemical device using thin micro-porous metal sheets. The porous metal sheet may have a thickness less than 200 μm, provides three-dimensional networked pore structures of pore sizes in the range of 2.0 nm to 5.0 μm, and is electrically conductive. The micro-porous metal sheet is used for positively and/or negatively-charged electrodes by providing large specific contact surface area of reactants/electron. Nano-sized catalyst or features can be added inside pores of the porous metal sheet of pore sizes at sub- and micrometer scale to enhance the reaction activity and capacity. Micro-porous ceramic materials may be coated on the porous metal sheet at a thickness of less than 40 μm to enhance the functionality of the porous metal sheet and may function as a membrane separator. The electrochemical device may be used for decomposing molecules and for synthesis of molecules such as synthesis of ammonia from water and nitrogen molecules.

21 Claims, 16 Drawing Sheets

(51) Int. Cl.

| | |
|---|---|
| *C25B 11/031* | (2021.01) |
| *H01G 9/042* | (2006.01) |
| *H01M 8/0236* | (2016.01) |
| *H01M 4/86* | (2006.01) |
| *C25B 1/00* | (2021.01) |
| *C25B 13/02* | (2006.01) |
| *C25B 13/04* | (2021.01) |
| *H01G 9/02* | (2006.01) |
| *H01G 9/052* | (2006.01) |
| *H01M 8/1004* | (2016.01) |
| *C25B 1/04* | (2021.01) |
| *C25B 9/73* | (2021.01) |
| *C25B 11/051* | (2021.01) |
| *C25B 11/057* | (2021.01) |
| *C25B 11/075* | (2021.01) |
| *H01M 50/46* | (2021.01) |
| *H01M 50/431* | (2021.01) |

(52) U.S. Cl.
CPC .......... *C25B 11/051* (2021.01); *C25B 11/057* (2021.01); *C25B 11/075* (2021.01); *C25B 13/02* (2013.01); *C25B 13/04* (2013.01); *H01G 9/02* (2013.01); *H01G 9/042* (2013.01); *H01G 9/052* (2013.01); *H01M 4/8621* (2013.01); *H01M 4/8657* (2013.01); *H01M 4/90* (2013.01); *H01M 4/9041* (2013.01); *H01M 8/0236* (2013.01); *H01M 8/1004* (2013.01); *H01M 50/431* (2021.01); *H01M 50/46* (2021.01)

(58) Field of Classification Search
CPC .... H01M 50/46; H01M 50/431; H01G 9/052; H01G 9/042; H01G 9/02; C25B 13/04; C25B 11/031; C25B 9/73; C25B 11/057; C25B 11/051; C25B 11/075; C25B 1/00
See application file for complete search history.

(56) References Cited

U.S. PATENT DOCUMENTS

| | | |
|---|---|---|
| 8,916,123 B2 | 12/2014 | Joshi et al. |
| 9,079,136 B2 | 7/2015 | Liu et al. |
| 9,540,737 B2 | 1/2017 | Botte |
| 10,017,866 B2 | 7/2018 | Yoo et al. |
| 2005/0282062 A1* | 12/2005 | Manako ............... C21D 8/0205 429/450 |
| 2011/0114254 A1* | 5/2011 | Xu ....................... H01M 4/0471 156/242 |
| 2011/0155662 A1* | 6/2011 | Liu .................... B01D 67/0046 210/510.1 |
| 2016/0138176 A1* | 5/2016 | Yoo ......................... C25B 15/02 204/239 |
| 2017/0037521 A1 | 2/2017 | Licht et al. |

OTHER PUBLICATIONS

Leng, et al., "Solid-State Water Electrolysis with an Alkaline Membrane", Journal of the American Chemical Society, pubs.acs.org/JACS, pp. 9054-9057, (2012).

Chen, et al., "Electrocatalytic Synthesis of Ammonia at Room Temperature and Atmoshperic Pressure from Water and Nitrogen on a Carbon-Nanotube-Based Electrocatalyst" Heterogeneous Catalysis, Angew. Chem. Int. Ed., 56, pp. 2699-2703, (2017).

Lan, et al., "Synthesis of ammonia directly from wet air at intermediate temperature", Applied Catalysis B: Environmental 152-153, pp. 212-217, (2014).

Millet, et al., "Water Electrolysis Technologies", Chapter 2, Introduction to Water Electrolysis, University of Paris, (XI) France, National Research Center "Kurchatov Institute", Moscow, Russian Federation, 19 pages, 2013.

Vermeiren, et al., "The Composite Zirfon Separator for Alkaline Water Electrolysis", Process Technology, Flemish Institute for Technological Research (VITO), Hydrogen Power: Theoretical and Engineering Solutions, pp. 179-184, (1998).

Kjartansdo'ttir, et al., "Development of durable and efficient electrodes for large-scale alkaline water electrolysis", International Journal of Hydrogen Energy 38, pp. 8221-8231, (2013).

Cheng, et al., "Sulfur-Nickel Foam as Cathode Materials for Lithium-Sulfur Batteries", ECS Electrochemistry Letters, 4(2), pp. A19-A21, (2015).

Zeng, et al., "Recent progress in alkaline water electrolysis for hydrogen production and applications", Progress in Energy and Combustion Science 36, pp. 307-326, (2010).

Licht, et al., "Ammonia synthesis by N2 and steam electrolysis in molten hydroxide suspensions of nanoscale Fe2O3", Ammonia Synthesis, Science, sciencemag.org, vol. 345, issue 6197, pp. 637-641, (Aug. 8, 2014).

Lan, et al., "Synthesis of ammonia directly from air and water at ambient temperature and pressure", Scientific Reports, Scientific Reports | 3 : 1145 | DOI: 10.1038/srep01145, pp. 1-7, Jan. 29, 2013.

\* cited by examiner

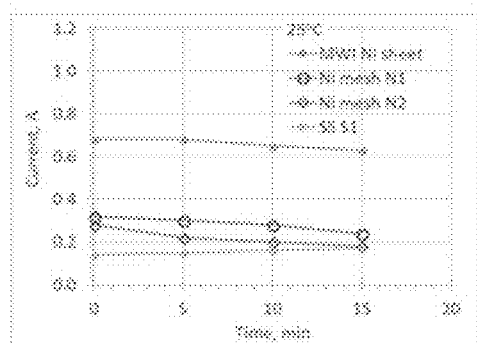
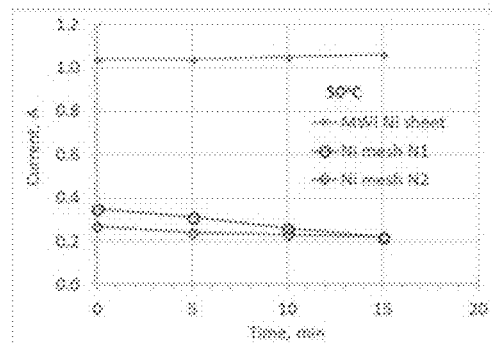
Fig. 8A	Fig. 8B
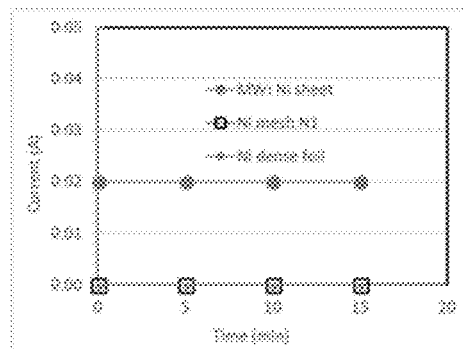
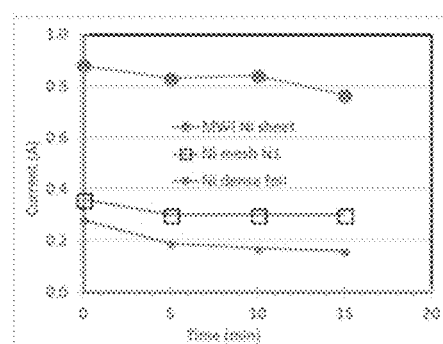
Fig. 9A	Fig. 9B

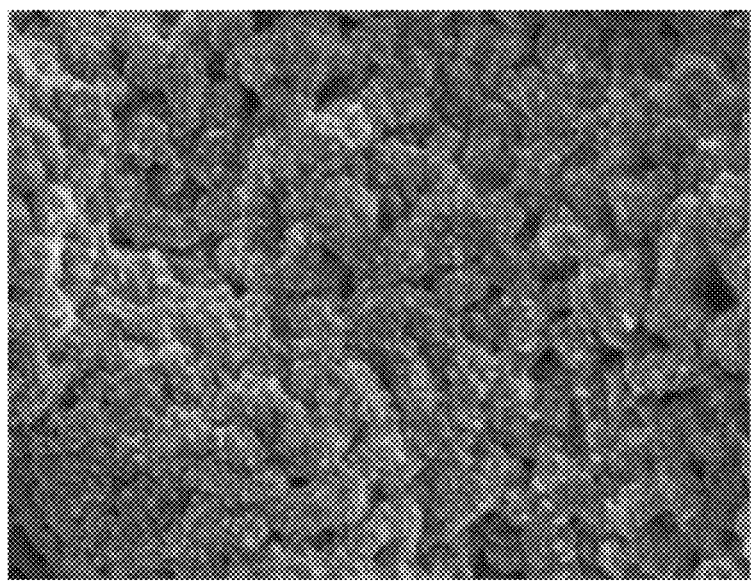
Fig. 22A
Fig. 22B
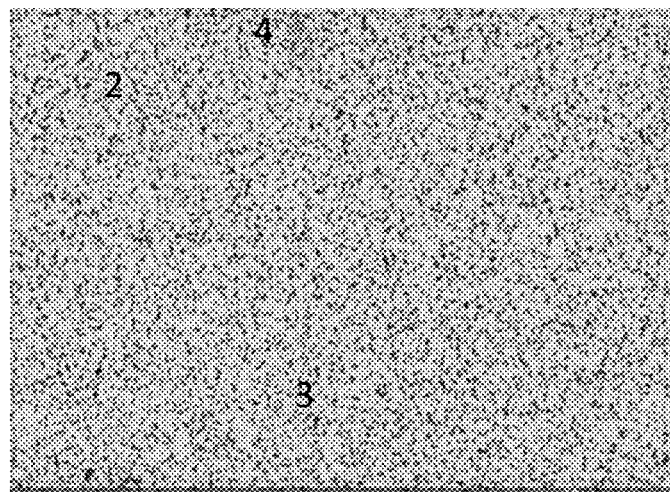
| Atomic % at different sampling spots | | | | |
|---|---|---|---|---|
| | 1 | 2 | 3 | 4 |
| N | 3.69 | 4.99 | 4.73 | 6.48 |
| O | 3.51 | 3.25 | 3.48 | 4.5 |
| Al | 0.81 | 0.21 | 0.78 | 0.23 |
| Si | 0.54 | 0.24 | 0.52 | 0.27 |
| Fe | 0.79 | 0.64 | 0.89 | 0.69 |
| Ni | 79.9 | 79.5 | 79.5 | 76.4 |
| Co | 1.2 | 1.11 | 1 | 1.17 |

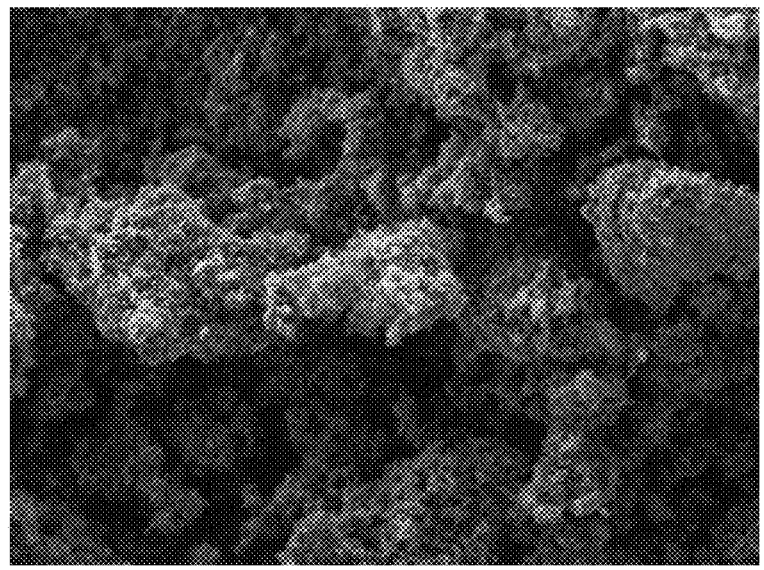
Fig. 23A
Fig. 23B
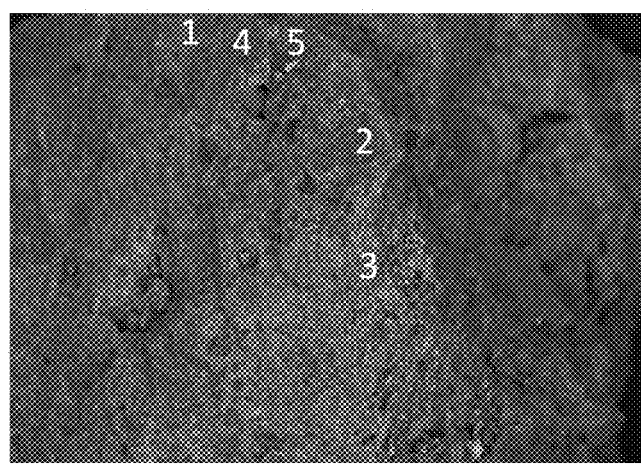
| Atomic % at different sampling spots | | | | | |
|---|---|---|---|---|---|
| | 1 | 2 | 3 | 4 | 5 |
| N | 3.3 | 3.4 | 1 | 3.4 | 4.5 |
| O | 47 | 55.8 | 18.6 | 55.9 | 61.2 |
| Al | 0.1 | 0.4 | 0.6 | 0.3 | 0.3 |
| Si | 2.3 | 2.3 | 3.7 | 2 | 2.6 |
| Fe | 47.3 | 38.2 | 75.7 | 38.4 | 31.4 |

ELECTROCHEMICAL DEVICE COMPRISING THIN POROUS METAL SHEET

CROSS REFERENCE TO RELATED PATENT APPLICATION

This application claims the benefit of U.S. Provisional Application No. 62/681,398, filed Jun. 6, 2018, hereby incorporated herein by reference in its entirety.

STATEMENT REGARDING RIGHTS TO INVENTION MADE UNDER FEDERALLY-SPONSORED RESEARCH AND DEVELOPMENT

This invention was made with Government support under contract number DE-AR0000816 awarded by the DOE, Office of ARPA-E. The Government has certain rights in this invention.

FIELD OF THE INVENTION

The embodiments of the present invention are generally directed to electrochemical systems and their operation, and specifically to electrochemical systems comprising thin porous metal sheets.

BACKGROUND OF THE INVENTION

A membrane separator, a positively-charged electrode, and a negatively charged electrode are three basic components for electrochemical conversion devices, such as for water electrolysis, electrochemical production of ammonia, fuel cells, and batteries. At the negatively-charged electrode, electrons are supplied for electrochemical reactions occurring in the electrode. At the positively-charged electrode, electrons are removed from electrochemical reactions. For example, the following chemical reactions occur in water electrolysis in alkaline electrolyte:

On negatively-charged electrode:

$$2e^- + 2H_2O \rightarrow 2OH^- + H_2$$

On positively charged electrode $$2OH^- \rightarrow 2e^- + 0.5\,O_2 + H_2O$$

Overall reaction $H_2O \rightarrow H_2 + 0.5\,O_2$

For operating hydrogen fuel cells in a hydroxide electrolyte, the following reactions occur on the electrode:

On negatively-charged electrode:

$$2e^- + H_2O + 0.5\,O_2 \rightarrow 2OH^-$$

On positively charged electrode:

$$H_2 + 2OH^- \rightarrow 2e^- + 2H_2O$$

Overall reaction: $H_2 + 0.5\,O_2 \rightarrow H_2O$

Electrochemical conversions are used in many important industrial processes and have become increasingly important for storage of electrical energy from renewable or intermittent sources, such as wind power, solar power, and hydraulic power. Hydrogen and oxygen, which are two widely-used gases, can be produced by electrolysis of water in an electrolysis cell. Vice versa, electrical power can be produced by combusting hydrogen with oxygen in a fuel cell. Rechargeable batteries, which are widely used in electronic equipment and electrical cars, involve reversible electrochemical reactions. The electrochemical reaction plays a role in some emerging processes, such as production of ammonia from water and nitrogen with electrical power. A small-sized electrochemical unit can be used to produce ammonia on demand, such as providing ammonia for selective catalytic reduction of nitric oxides on vehicles. A large-size unit can be used to produce ammonia from wind or solar power for fertilizer or a chemical energy storage medium.

One common need for these electrochemical devices is an electrode that can provide high surface area for electrons to react with reactants per unit volume, i.e., specific surface area. Great amounts of research and development efforts have been devoted toward discovery of new reaction chemistry, improvements of electrolyte materials, improvements of catalysts, and formulations. However, the improvements to backbone structures of the electrode has been limited by availability of current material products. Embodiments described herein fill this gap.

In addition to the backing structure of the electrode, various embodiments described below provide a new material structure for the separator. As a component for electrochemical conversion devices, the separator provides one or more of the following functions: i) keeping the positively and negatively charged electrodes electrically insulated from each other to avoid short-circuit, ii) allowing the electrolyte to pass through, and iii) keeping the reaction products from the two electrodes separated.

In an embodiment, the separator is a membrane insulator that does not conduct electricity while allowing ions to pass through. For example, the separator allows OH— to pass through in alkaline-type electrolytes, $H_3O^+$ to pass through in proton-type electrolytes, and $Li^+$ ions to pass through in lithium batteries. To have high power and energy density, the membrane separator is preferred to be as thin as possible. However, the membrane separator must be thick enough to prevent the two electrodes from being short-circuited and be strong enough to maintain structural integrity as the reaction occurs back and forth periodically. Thus, thin, durable, and highly-permeable membrane separators are desired for increased power and/or energy density of the electrochemical device.

The desire for more efficient electrodes and membrane separators are exemplified by development of electrochemical conversion process to produce ammonia from nitrogen and hydrogen or from nitrogen and water. Today, ammonia is mostly produced via thermo-catalytic reactions of nitrogen and hydrogen under high temperatures (350-520° C.) and high pressures (100-300 bar). Such a production process, which is commonly referred as the Haber-Bosch process, is very capital and energy-intensive, and becomes economic when the production capacity scale is very high, much higher than the scale of ammonia production from renewable electrical power sources. On the other hand, this conversion process is thermodynamically favored at low temperatures.

$$3H_2 + N_2 \Leftrightarrow 2NH_3 \quad \Delta H = -92.4\ kJ\cdot mol{-1}$$

U.S. Pat. No. 7,314,544 B2 (2006) discloses an electrochemical method for synthesis of ammonia from nitrogen and hydrogen gas from an electrolyte comprising Li hydride+Li nitride molten salts. Without a membrane separator, a mixed product stream from the anode and cathode reactions will be produced. Using a lithium ion conductive membrane are disclosed in U.S. Pat. No. 8,916,123 B2 (2014) for producing ammonia from nitrogen and water in lithium nitride electrolyte, where nitrogen reacts lithium hydroxide to form lithium nitride and the lithium nitride is converted back to lithium hydroxide while producing ammonia by reaction with water. Actual examples of producing ammonia from nitrogen and water at temperatures well below the Haber-Bosch process are disclosed in U.S. Patent Publication No. 2016/0138176A1 (2016), U.S. Patent Publication No. 2017/0037521 (2017), and U.S. Pat. No. 9,540,737 B2 (2017). These three patents disclose the use of alkaline-type electrolytes, including alkaline hydroxide water solutions, alkaline hydroxide and salts, and eutectic molten alkaline hydroxides. However, the membrane separator was not described. Having a separator is desired to keep the oxygen and hydrogen produced from the respective electrodes separated because the hydrogen and oxygen gas mixture can be explosive. Further, the separation of hydrogen and oxygen is expensive even if the mixture concentration is controlled beyond the explosion limits. The literature reports using of proton conducting electrolyte (PEM) membrane as a separator for low-temperature production of ammonia from air and water (Lan et al. "Synthesis of ammonia directly from air and water at ambient temperature and pressure" Scientific Reports, 3 (2013) 1145). However, those PEM membrane cells often use precious metal catalysts. Ceramic-type ion conducting membranes have been explored (for example, Lan et al. "Synthesis of ammonia directly from wet air at intermediate temperature" Applied Catalysis B: Environmental 152-153(2014) 212-217).

In summary, more efficient and productive electrochemical devices are needed to realize practical application of ammonia production from nitrogen and water.

SUMMARY OF THE INVENTION

Embodiments described herein teach use of high surface area porous metal sheets as backbone structures for the electrode and/or membrane separator in electrochemical conversion devices. FIG. 1 illustrates a metal sheet 100 of thickness less than approximately 200 μm having networked pore structures 102 with pore sizes at micro- and sub-micrometer levels which may be used as the structural material for both the positively-charged electrode 104 and negatively-charged electrode 106 (FIG. 2A), the positively charged electrode 104 only (FIG. 2B) or the negatively charged electrode 106 only (FIG. 2C). The micro-porous metal sheet 100 is electrically conductive and provides large specific surface areas for electrons to react with reactants inside the pore. The networked porous structures 102 enable reactants, electrolytes and products to move in and out of the electrode body. The chemical composition and/or pore structures of a micro-porous metal sheet 100 can be adjusted to meet specific application needs of a given electrode reaction.

When the micro-porous metal sheet 100 is used in one electrode (FIG. 2B or FIG. 2C), the other electrode preferably comprises a paste or coating of packed catalyst particles with particle sizes ranging from a few nm to tens of μm. Examples of the catalyst particles include nano- and/or micro-sized transition metals (Fe, Ni, Co, and their alloys), transition metal-ceria nano-composites, carbon-supported transition metals and metal oxides, transition metal nitrides, and carbon-supported metal nitrides. Some conducting materials such as carbon black may be added into the paste to enhance electron conductivity of the packed particle layer. Some binders may be added to the packed particle layer to hold the particles in place.

Another embodiment includes integration of the electrode 104 or 106 with a membrane separator 108 as illustrated in FIG. 3. A membrane layer 108 is prepared on the porous metal sheet 100. The micro-porous metal sheet 100 that supports the membrane layer 108 may function as either a positively 104 or negatively 106 charged electrode. Regarding those membrane materials that are too weak or too fragile to be prepared as a self-supported thin (<40 μm) membrane sheet 108, the micro-porous metal sheet 100 may be used as an effective support. For example, ceramic-type materials are very difficult to prepare and use as a thin sheet because they easily break. Processing those ceramic-type materials into a membrane often involves reaction and/or treatment at such high temperatures (e.g., >300° C.) that most polymeric supports become unstable. The high mechanical strength and temperature tolerance of metallic materials as well as the uniform surface pore structures makes the micro-porous metal sheet 100 suitable support for those membranes 108.

An embodiment is drawn to an electrochemical conversion device comprising an assembly of positively-charged electrode, a negatively charged electrode and a membrane separator. At least one of the positively-charged electrode, the negatively charged electrode or the membrane separator comprises at least one electrically-conducting metal-based porous sheet having: a thickness less than 200 μm, a networked pore structure with 80-90% pores having pore sizes less than 5 μm, and a porosity in the range of 20 to 80%.

Another embodiment is drawn to A device for the electrochemical production of ammonia comprising an assembly of positively-charged electrodes comprising an electrically-conducting metal-based porous sheet, the electrically-conducting metal-based porous sheet comprising a thickness less than 200 μm, a networked pore structure with 80-90% of the pores having pore sizes less than 5 μm, and a porosity in the range of 20 to 80%, a membrane separator comprising a porous ceramic material having a thickness less than 40 μm and a negatively charged electrode comprising a catalyst of nano-sized iron, a mixture of carbon with nano-sized iron and/or iron oxide, carbon-supported nano-sized iron, carbon supported nano-iron oxide, carbon-supported nano-iron nitride, a mixture of carbon with iron nitride, or mixtures thereof.

BRIEF DESCRIPTION OF THE DRAWINGS

FIGS. 8A and 8B are plots illustrating a comparison of water electrolysis by a nickel sheet according to an embodiment and commercial metal meshes.

FIGS. 9A and 9B are plots illustrating a comparison of water electrolysis by a nickel sheet according to another embodiment and commercial metal meshes.

FIG. 22A is a photograph of micro- and nano-structures of the N—Ni catalytic sheet according to an embodiment at 50,000×

FIG. 22B is a photograph of the sheet of FIG. 22A at 500× and includes spots sampled for atomic composition analysis.

FIG. 23A is a photograph of micro- and nano-structures of Fe/C(2M) catalyst according to an embodiment at 10,000×

FIG. 23B is a photograph of the structure of FIG. 23A at 500× and spots sampled for atomic composition analysis.

DETAILED DESCRIPTION OF THE INVENTION

Figure 1:
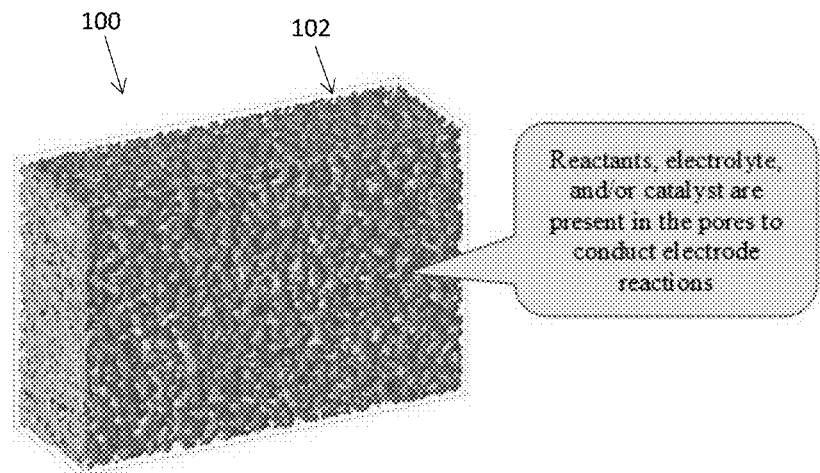
FIG. 1 is a perspective view of a microporous metal sheet suitable for backbone structures of an electrochemical conversion device according to an embodiment.
Figure 3:
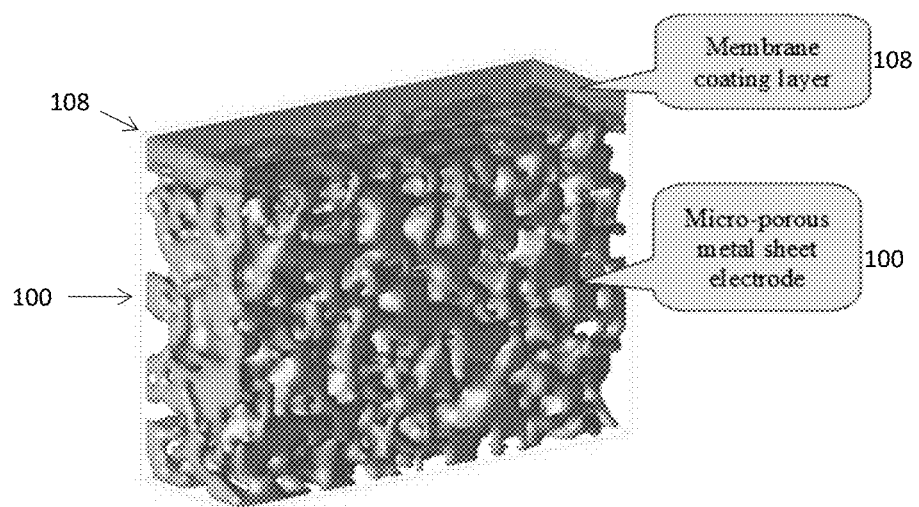
FIG. 3 is perspective view of a membrane separator supported on a microporous metal sheet according to an embodiment.
Figure 2A:
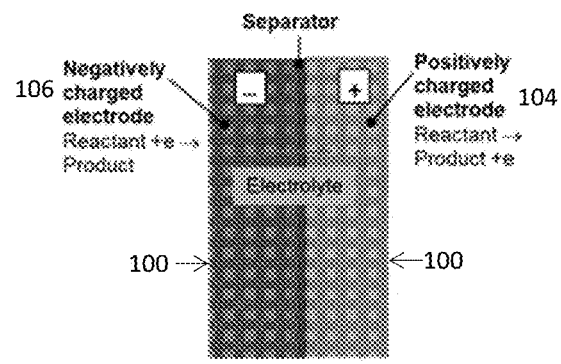
FIGS. 2A-2C are schematic illustrations of embodiments of using the microporous sheet of FIG. 1 in an electrochemical conversion device.
Figure 2B:
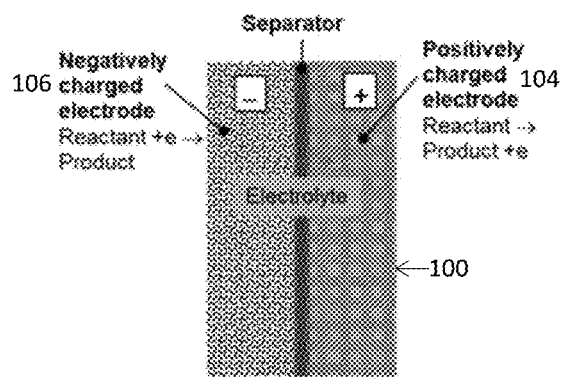
Figure 2C:
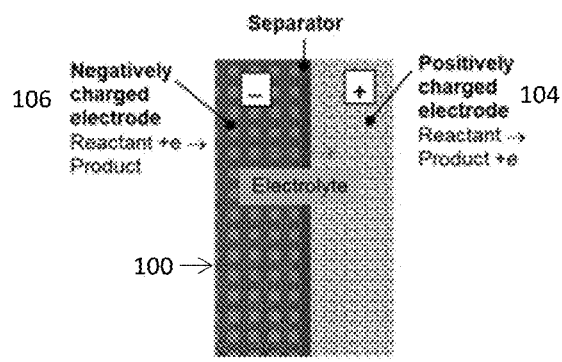
Figure 4A:
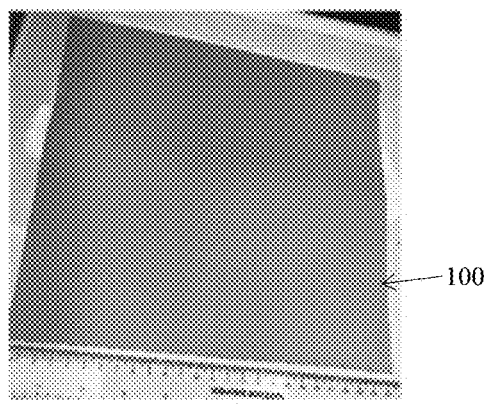
FIGS. 4A-4D are micrographs illustrating structural characteristics of microporous metal sheets according to embodiments.
Figure 4B:
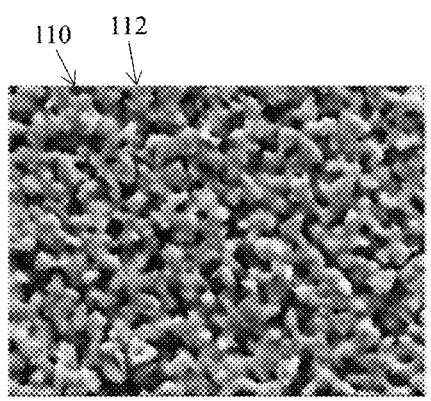
Figure 4C:
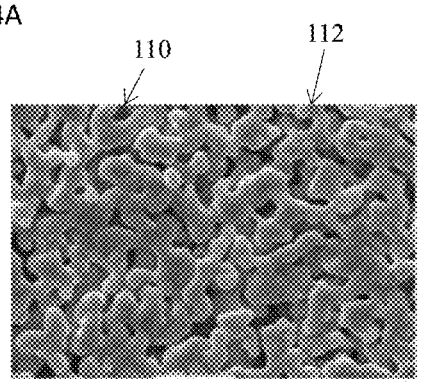
Figure 4D:
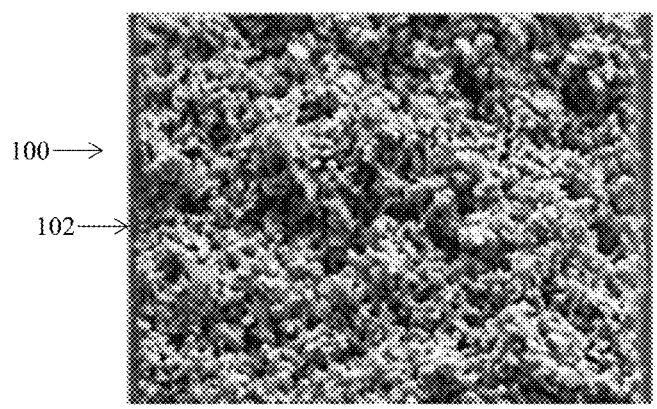

Morphologies and structural features of the micro-porous metal sheet electrode of various embodiments are shown in FIG. 4 with a 20 cm×20 cm×50 μm porous nickel sheet. The thin flat sheet 100 provides a smooth and uniform surface (FIG. 4A), like a metal foil. Its uniform micro-structure is revealed under scanning electron microscopy (SEM) (FIGS. 4B and 4C). The surface comprises pores 110 at micro and sub-micrometer level formed among metallic grains 112. The surface becomes more porous at higher porosity. The three-dimensional pore structure 102 is evident in the cross-sectional view (FIG. 4D). The porosity is connected throughout the thickness.

Preferably, the metal sheet 100 is a conductor that distributes electrons from the current connecting point throughout the whole sheet 100 or collects electrons from the whole sheet 100 to the current connecting point. The metallic material itself can function as an electrochemical reaction catalyst. Or a catalyst can be deposited on the surface of the electron-conducting metal grains 112 inside the pores 110. The multiphase reacting area enhancement factor is defined as ratio of the electron/reactant reaction area in a porous metal sheet electrode 104, 106 to its geometric surface area. The relationship between the multiphase reacting area enhancement factor and the pore size and porosity can be described by the following equation:

$$F = \frac{SA_r}{SA_g} = \frac{4\delta_e \cdot \varepsilon}{d_p}$$

Where F=enhancement factor, $SA_r$=electron/chemical reacting area, $SA_g$=geometric surface area of the sheet, $\delta_e$=sheet thickness, $\varepsilon$=porosity, and $d_p$=pore diameter Thus, the enhancement factor is 1 for a dense metal foil-based electrode. With a porous metal sheet 100 of 50 μm-thickness ($\delta_e$), 50% porosity, and 0.5 μm mean pore size ($d_p$), the enhancement factor is 200. The extent of the impact of porosity on the enhancement factor is limited. The difference is only by a factor 2 for a highly porous sheet (0.70) relative to low porosity one (0.35). For a constant porosity, the impact of pore size is dramatic. The enhancement factor for a sheet of 0.1 μm pore can be 10 times of the 1 μm-pore sheet and 100 times of a 10 μm-pore sheet. The impact of the sheet thickness on the enhancement factor is also limited, because the transport resistance for the reactants to get inside the electrode and for the products to get out of the electrode increases proportionally with the sheet thickness.

The volumetric productivity of an electrode is a parameter for electrochemical devices and related to the volume-specific surface as described below:

$$SA_V = \frac{SA_r}{V_e} = \frac{4\delta_e}{d_p}$$

The specific surface area increases with decreasing pore size in inverse first order.

The above discussion highlights desirability of reducing pore size on the electrochemical reacting area in a porous electrode.

The porosity of a porous sheet 100 can be measured as geometric porosity and sorption porosity as described below.

$$\varepsilon_g = 1 - \frac{\rho_g}{\rho_m}$$

$$\varepsilon_l = \frac{V_l}{V_g}$$

Where $\varepsilon_g$=geometric porosity, $\rho_g$=geometric density, $\rho_m$=material density, $\varepsilon_l$=sorption porosity, $V_l$=volume of liquid sorption, $V_g$=geometric volume.

The geometric porosity is simply measured based on the weight and volume of a porous metal sheet relative to its material density. The liquid sorption porosity can be measured by the amount of the liquid that can be taken up by a given volume of the porous metal sheet 100. The liquid fluid used in the measurement should be fully wetable. Thus, if all the pores 110 are connected in a porous metal sheet 100, the geometric porosity should be equal to the liquid sorption porosity. If the sorption porosity is less than the geometric porosity, some fraction of the pores in the porous metal sheet 100 is not accessible by the liquid. As an effective electrode structure, the porous metal sheet 100 should have a liquid sorption porosity the same or very close to the geometric porosity. For the porous metal sheet structures shown in FIG. 4, the liquid sorption porosity is the same as the geometric porosity.

Figure 5A:
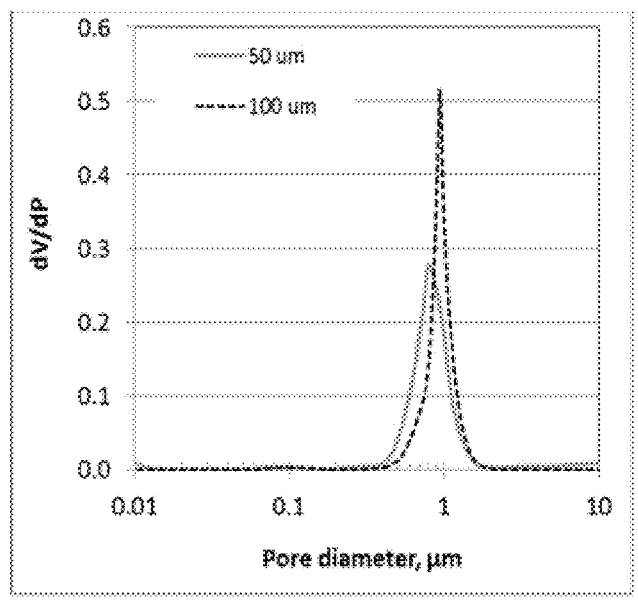
FIGS. 5A and 5B are plots illustrating the pore size distribution of porous metal sheet electrodes according to an embodiment.
Figure 5B:
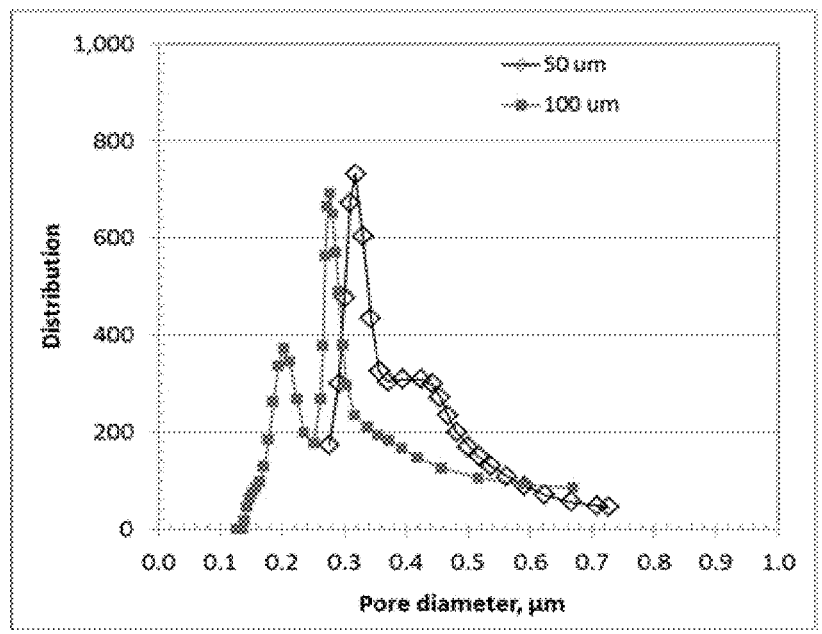

The pore size of a porous metal sheet 100 can be physically examined under microscopy. For a micro-porous metal sheet 100, the pore size is better characterized by use of established analytical procedures in the field. The external pore size of a porous metal sheet 100 can be characterized by mercury porosimetry technique as shown in FIG. 5A. A single, narrow peak is shown in the pore size distribution profile for the two porous metal sheets 100 of different thickness, which indicates uniform surface pore structures. The number of pores above 2 μm is less than 1% for these two sheets 100. Capillary flow is another common method to characterize the pore size distribution of a porous metal sheet 100. Different from mercury porosimetry, the capillary flow technique measures the pore size based on the gas flow path, i.e., along the sheet thickness. FIG. 5B shows that the pore size distribution of the two porous metal sheets 100. Compared to FIG. 5A, a substantial presence of smaller pores inside the sheet is revealed. The pore size is within the range of 0.1 to 0.8 μm, i.e., sub-micrometer level.

Figure 6:
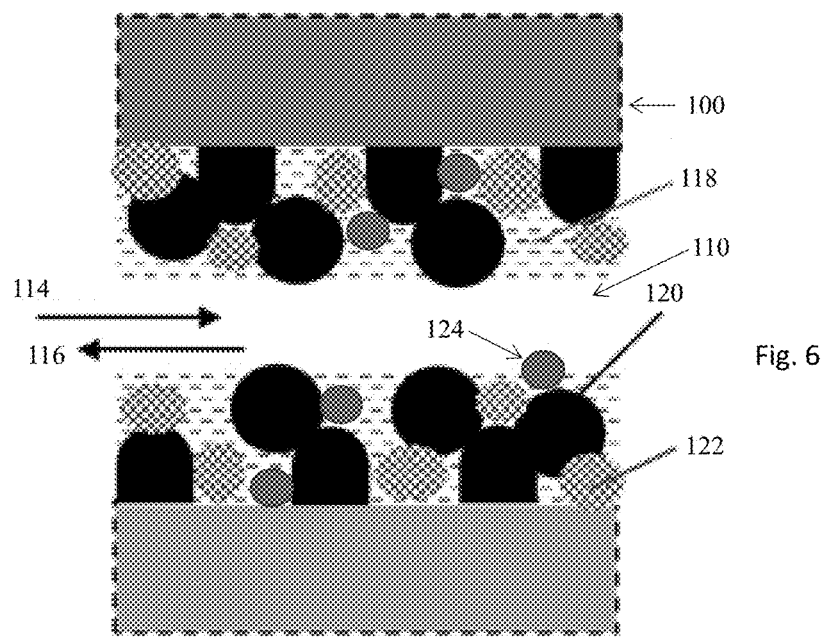
FIG. 6 is a schematic illustration of loading of nano-sized catalyst particles inside pores of a porous metal sheet according to an embodiment.

A nano-catalyst 120, stabilizer 122, and/or promoter 124 can be loaded inside pores 110 of a porous metal sheet 100 to catalyze a desired reaction and suppress undesirable reactions as shown in FIG. 6. Reactants 114 in the electrolyte 118 flow into the pores 110 and reaction products 116 flow out of the pores 110. The size of nano-catalyst is preferably smaller than the pore size of the porous metal sheet 100, preferably by a few times so that a certain fraction of the pore opening is preserved for rapid transport of the reactant and product. Preferably, the catalyst is in intimate contact with the metallic grains 112. Several methods can be used to load the nano-catalyst inside the support pores 110, which include impregnation and chemical vapor deposition.

With the impregnation technique, a catalyst precursor is first prepared in a solution form. The solution is used to fill up the pores 102, 110 of the porous metal sheet 100. Then, the liquid carrier is removed by drying, such as by the application of heat or vacuum or both. The dried sample may be activated by heating under a controlled gas environment. For example, the salts of transitional metals (Fe, Co, Ni, Mn, etc.) can be dissolved in an aqueous solution. After drying, nano-oxide catalysts are obtained by heating the sample in an oxidizing gas environment, and nano-metallic catalysts are obtained if the dried sample is heated in a reducing gas environment. Aluminum oxide, silicone oxide or zirconia oxide may be added by impregnation to promote and stabilize the catalytic activity of the nano-transition metal (oxide) catalyst.

With the chemical vapor deposition method, the porous metal sheet 100 is heated in a gas environment containing the catalyst precursor so that the catalyst precursor diffuses into the pores 102, 110 and grows the catalyst inside the pores 102, 110.

Figure 7A:
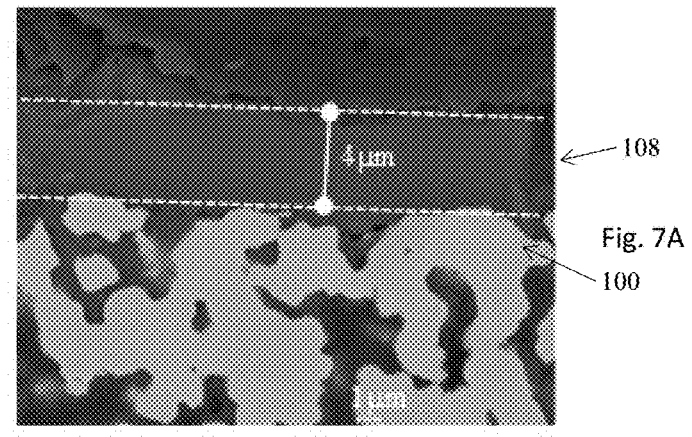
FIGS. 7A and 7B are SEM micrographs illustrating embodiments of a one-layer coating and a two-layer coating, respectively, of porous ceramic coatings on a microporous metal sheet electrode.
Figure 7B:
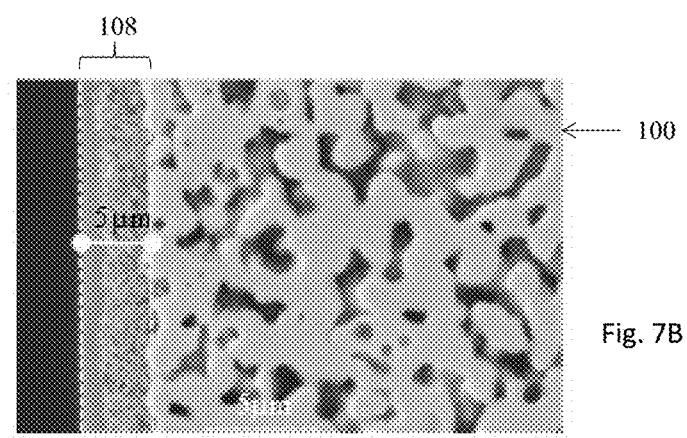

A coating layer 108 that is permeable to ions but is electrically non-conductive can be deposited on one surface of the micro-porous metal sheet 100 to combine the membrane separator 108 with one or two electrodes into one body. In an embodiment, the membrane thickness is preferably about 2 to 10 times the size of the opening on the micro-porous metal surface to which the coating is applied so that the metallic grain surface is fully covered by a continuous coating layer 108. Complete coverage of the metallic grains 112 is desirable to eliminate possible short-circuit. The pore size in the coating layer 108 may be determined by the properties of the material coated and can be one to a few orders of magnitude smaller than the opening of the micro-porous metal sheet 100. Materials suitable for membrane separators 108 include, but are not limited to, metal oxides, ceramics, glass, and metal oxide+polymer mixed metric. The membrane separator 108 can comprise one coating layer of the same material composition and/or structures (FIG. 7A), or multiple layers of different materials and/or structures (FIG. 7B). The membrane thickness can be determined by physically examining the cross-section under microscope as shown in FIGS. 7A and 7B. The coating thickness can also be assessed by the areal loading density, which can be calculated based on experimental measurements and determined from the following equations:

$$w_{c,s} = \frac{W_c}{SA_c}$$

$$\delta_{c,s} = \frac{W_{c,s}}{\rho_{c,p}}$$

Where $w_{c,s}$=areal loading density (g/cm$^2$), $W_c$=weight of the material coated on the support sheet (g), $SA_c$=area of the support sheet that is coated (cm$^2$), $\delta_{C,S}$=thickness of the coated layer (cm), $\rho_{c,p}$=packing density of the material coated (g/cc).

Most metal oxides have a packing density over a range of 1 to 3 g/cc. The coating thickness is preferably less than $2\times10^{-3}$ cm (20 μm), corresponding to coating loading of $1-6\times10^{-3}$ gcm$^2$.

The membrane layer 108 can be formed on the porous metal sheet 100 by hydrothermal growth. The seeds for the molecular sieves may be distributed on the support sheet surface and then, the seeded sheet is immersed inside a growth solution. A continuous membrane layer 108 is formed as the crystals of the molecular sieve grow out of the seeds and fill up the inter-crystal voids under certain temperature and time.

In an embodiment, the membrane layer 108 can be made by wet chemistry coating and post treatment. Ceramic powder such as zirconia of particle sizes ranging from 200 to 20 nm may be dispersed in a liquid carrier to form a homogenous coating slurry or solution. The coating solution is applied to the metal sheet support 100 to form a continuous packing of the ceramic particles. Then, the coated sheet may be heated under appropriate gas environment such that the ceramic particles are sintered to form a durable coating layer 108. The sintering conditions (gas environment, temperature, and time) may be selected to achieve a desired degree of sintering while not causing damage to the porous metal support 100. For example, at temperatures above 500° C., inert or reducing gas if preferably used to prevent the metal sheet 100 from oxidation.

In another embodiment, the coating is applied by vapor deposition. The material to be coated may be sputtered into small particles or fragments in a gas phase or under vacuum. The fragments/particles are deposited on the porous metal sheet 100 supporting surface to form a continuous layer 108.

One function of the membrane separator 108 in an electrochemical conversion device is to keep the electrodes 104, 106 of opposite charges insulated from each other. Thus, durable insulating materials, such as zirconia oxide, ceria, alumina oxide, and silicone oxide, are preferred. For a given material, the resistance of the membrane separator 108 to short-circuit or electrical penetration increases with the thickness. However, a thick membrane layer 108 preferably avoided in the disclosed embodiments. One problem with thick membrane layers 108 is that a thick membrane 108 on the porous metal sheet support 100 tends to crack and delaminate. Thus, thickness less than 40 μm is preferred. Another problem with a thick membrane layers 108 is increased transport resistance. Allowing a certain ion in the electrolyte 118 to permeate through is another function of a membrane separator. However, the transport resistance proportionally increases with the membrane thickness.

As a membrane separator 108, the coated material may have intrinsic ionic conductivity or may provide channels for the electrolyte 118 to move back and forth. For example, zirconia materials do not have ionic conductivity at low temperatures, but a porous zirconia membrane 108 can host an alkaline hydroxide electrolyte solution by capillary force. The capillary pressure is related to the surface tension, contact angle, and pore radius by the following equation:

$$\Delta P_c = \frac{2\sigma \cdot \cos(\theta)}{r_p}$$

Where $\Delta P_c$=capillary pressure, $\sigma$=surface tension of the liquid, $\theta$=contact angle, and $r_p$=pore radius.

A KOH solution has a surface tension about 0.067 N/m at 37° C. If the solution is fully wetable in the pore, the capillary pressure is about 26 bars for a pore of 50 nm radius. In other words, the pore can hold the solute to withstand 26 bars of a pressure gradient. If the membrane material does not provide ionic conductivity, a porous membrane layer 108 made of a material that is fully wetable to the solute solution with pore an opening below 100 nm should be provided to hold the electrolyte solution firmly.

Example I. Water Electrolysis with Thin Porous Ni Sheet Electrodes

The reactivity of micro-porous metal sheets 108 as an electrode is tested with a porous Ni alloy sheet 108 produced by Molecule Works Inc. (MWI) for water electrolysis. Two 2 cm×3 cm coupons were cut from of a porous Ni sheet of about 50 μm thickness and about 40% porosity. The coupons may be clamped together with a 0.5 mm thick polyester mesh separator to serve as respective positive and negative electrodes. The pair is then immersed in a KOH solution. Gas bubbles emerge from the two electrodes as the voltage applied to the two electrodes exceeds 1.3V. The current was recorded and compared to the other metallic materials in FIGS. 8A and 8B. The structural features of these materials are listed in Table 1 below. The comparative mesh materials have a material areal density of about 1.3 times of the MWI Ni sheet and a thickness about 20 times of the MWI's Ni sheet. FIG. 8A shows that the current obtained with MWI's Ni sheet at 25° C. is about 3 times of the current obtained with conventional Ni and stainless steel meshes. The enhancement increases at higher temperatures. At 50° C., the current density obtained with the MWI Ni sheet is about 5 times of that obtained with the other, conventional metal meshes.

Water electrolysis with MWI's Ni sheet in a 30 wt. % KOH solution at 50° C. is compared to a Ni mesh and dense Ni foil in FIGS. 9A and 9B. At 1.6V (FIG. 9A), only the MWI Ni sheet shows current while the current with the Ni mesh and dense Ni foil is too low to be measured. At 2.0V, the MWI Ni sheet produces current about three times that of the Ni mesh and four times that of the dense Ni foil (FIG. 9B). The dense Ni foil has the same geometry as the MWI Ni sheet, i.e., 50 μm-thin flat sheet. Its material areal density is about 1.6 times of the MWI Ni sheet. The results clearly demonstrate a dramatic improvement of the micro-porous structure 102 to the water electrolysis activity for the same kind of electrode material.

Figure 10:
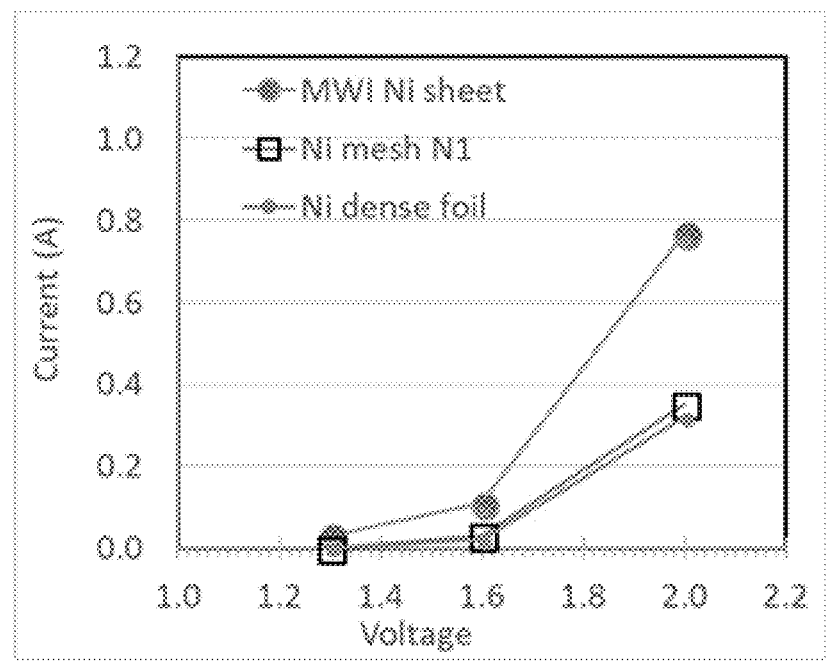
FIG. 10 is a plot illustrating a comparison of water electrolysis by a nickel sheet according to another embodiment and commercial metal meshes.

Water electrolysis of the MWI's Ni sheet at 100° C. under different voltage is compared to the Ni mesh and dense Ni foils in FIG. 10. The current is measured after the electrolysis reaction is stabilized at 15 min. Under the same conditions, the MWI Ni sheet shows current about two to three times that of the Ni mesh and dense Ni foils. The consistent improvement in reactivity under various conditions is attributed to the higher surface area for electron/water reaction in the MWI Ni sheet relative to the metal mesh and foil.

TABLE 1

Information of porous materials used as water electrolysis electrode

| Name | Porous structure | Areal density (g/cm$^2$) ratio | Thickness ratio |
|---|---|---|---|
| MWI Ni sheet | 0.050 mm-thin flat sheet of networked micro-porous structures, made in-house | 1 | 1 |
| Ni mesh N1 | 0.23 mm-thin Ni mesh of about 1 mm pore made in a waved form of 1 mm height and 2.5 mm wavelength, a commercial product | 1.34 | 20 |
| Ni mesh N2 | 0.23 mm-thin Ni mesh of about 1 mm pore made in a waved pattern of 1.3 mm height and 2.5 mm wavelength, a commercial product | 1.34 | 25 |
| SS1 | 0.20 mm-thin stainless-steel mesh of about 1 mm pore made in a waved pattern of 1 mm height and 2.5 mm wavelength, a commercial product | 1.34 | 20 |
| Dense Ni foil | 0.050 mm-thin flat sheet of dense nickel metal foil, a commercial product | 1.7 | 1.0 |

Example II. Coating of Porous Ceramic Membranes on the Porous Metal Sheet

A porous Ni sheet 100 made in-house is coated with ceramic materials to form an electrically-insulating layer 108 for separating two electrodes 104, 106 of opposite charges. Table 2 lists a group of ceramic coatings 108 on the 3 cm×5 cm Ni sheets 100 of slightly different thickness and porosity. The porous Ni sheet 100 is first coated with NiO-promoted yttria-stabilized-zirconia (Ni—YSZ) of 200 nm mean particles by vacuum filtering. The 50 nm YSZ particles are used to form a second coating 108. The coated sample is dried and sintered at 815° C. in a controlled gas environment. The amount of coating may be characterized by areal loading density (g/cm$^2$), which may be calculated by normalizing the coating weight gain with the coated area. The coating thickness may be calculated from the difference in the thickness between the bare support sheet and the coated sheet. By varying the amounts of the coating solutions used to form the first and second coatings 108, coatings 108 of different areal density and thickness may be obtained. If the coating layer porosities are the same, the coating thickness increases proportionally with the areal density. Variance in the coating thicknesses among samples of the same or similar areal density suggests that these coating layers 108 have different porosity. The coated sample may be tested for electrical conductivity. The results listed in Table 2 show that the coating layer 108 has no electrical conductivity if the areal density is above about 3 mg/cm$^2$ and/or the coating thickness is above about 10 μm.

TABLE 2

Ceramic coatings on MWI's porous Ni sheet (3 cm × 5 cm) as separator

| ID No | Ni sheet thickness, μm | Ni sheet porosity, % | Coating material 200 nm Ni-YSZ base coating | Loading, mg/cm$^2$ | Coating thickness, μm | Resistance, ohm |
|---|---|---|---|---|---|---|
| 1 | 49 | 42 | base | 1.1 | | |
| 2 | 49 | 45 | +50 nm YSZ | 0.6 | 9 | |
| 3 | 49 | 47 | +50 nm YSZ | 0.8 | 2 | 4 |
| 4 | 49 | 45 | +50 nm YSZ | 0.8 | 3 | 4 |
| 5 | 49 | 47 | +50 nm YSZ | 1.6 | | |
| 6 | 49 | 43 | base | 1.7 | 5 | 43 |
| 7 | 49 | 44 | +50 nm YSZ | 1.6 | 5 | 35 |
| 8 | 49 | 44 | +50 nm YSZ | 1.8 | 6 | |
| 9 | 49 | 42 | +50 nm YSZ | 3.6 | 20 | No conductivity |
| 10 | 47 | 43 | +50 nm YSZ | 3.2 | 23 | No conductivity |
| 11 | 47 | 43 | +50 nm YSZ | 3.1 | 11 | No conductivity |
| 12 | 47 | 43 | +50 nm YSZ | 4.2 | 15 | No conductivity |
| 13 | 47 | 41 | +50 nm YSZ | 3.2 | | |

Figure 11A:
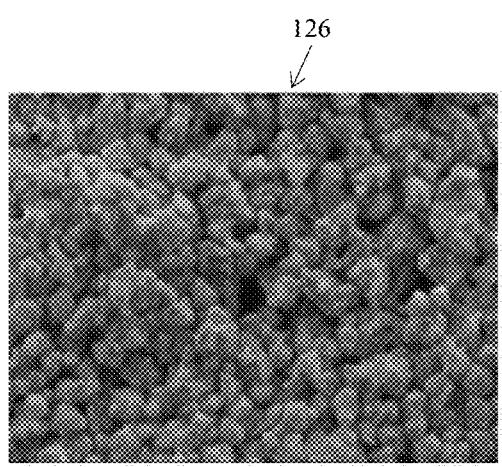
FIGS. 11A and 11B are SEM micrographs illustrating microstructures of ceramic coatings according to an embodiment.
Figure 11B:
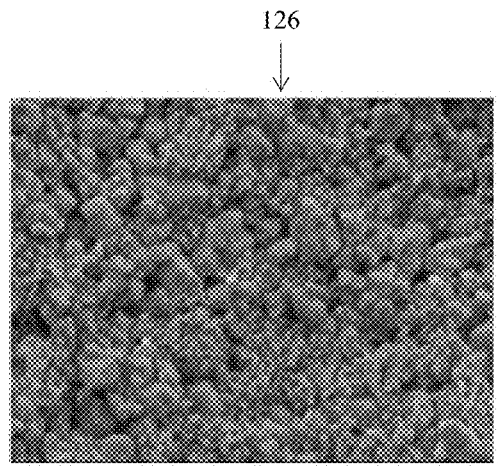

The micro-structures of the ceramic coating surface are shown in FIGS. 11A and 11B. Particle or crystalline grains 126 of average 200 nm size are seen on the coating of the 200 nm Ni—YSZ (FIG. 11A). NiO as a sintering promoter is incorporated into the YSZ grain. The YSZ crystalline grains are sintered neck-to-neck. Some voids of about 100-200 nm size are present due to random packing of the YSZ particles. Such voids are filled with 10-50 nm YSZ particles 126 via a second coating (FIG. 11B). These results show that a porous Ni sheet 100 can be coated with ceramic particles of different sizes to form a coating surface having pore sizes that can be orders of magnitude smaller than the support pore 102.

Figure 12:
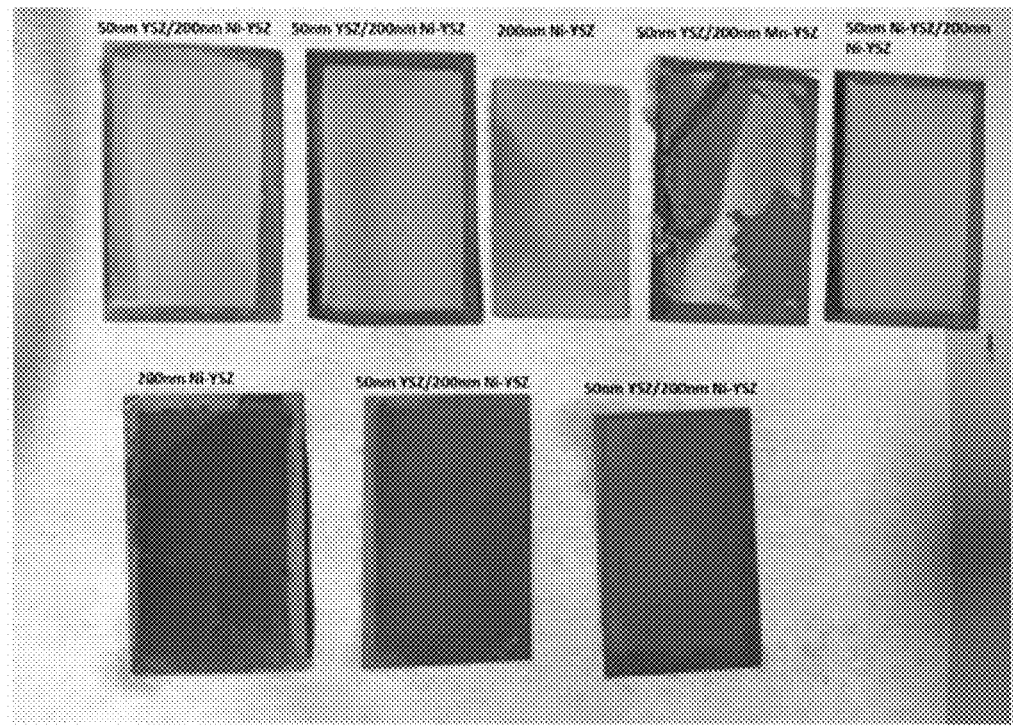
FIG. 12 is a photograph illustrating morphologies of membrane coupons after a 24-hour hydrothermal treatment according to an embodiment.

The ceramic coated Ni sheet 100 can be used as a membrane separator 108 for electrochemical conversion devices. The stability of the coating layer may be tested by heating the membrane coupons in an autoclave reactor. The five samples in top row in FIG. 12 were soaked with 50 wt. % KOH solution and placed in an autoclave reactor exposed to steam. The autoclave reactor is filled half with the 50 wt. % KOH solution. The three samples in bottom row of FIG. 12 were immersed inside the solution. The autoclave reactor was heated at 120° C. for 24 hours. All the membrane coupons except for 50 nm YSZ/200 nm Mn—YSZ are intact. The 50 nm YSZ/200 nm Mn—YSZ membrane has a bottom layer of coating with MnO-doped YSZ particles of 200 nm size and top layer coating of 50 nm YSZ particles. This membrane coating layer is cracked and peeled off the support after the heating. Both one-layer coatings with 200 nm Ni—YSZ and two-layer coatings with 50 nm YSZ/200 nm Ni—YSZ are stable. No cracking or delamination is found when the sample is either exposed to water vapor or exposed to the KOH solution. The results demonstrate the stability of this type of membrane coating materials for both vapor-phase and liquid-phase electrochemical conversion processes.

Example III. Ionic Conductivity of KOH-Immobilized Ceramic Membrane

Figure 13A:
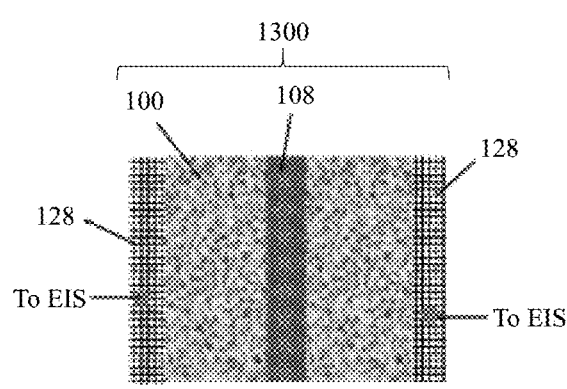
FIG. 13A is a schematic drawing illustrating the test cell configuration according to an embodiment.
Figure 13B:
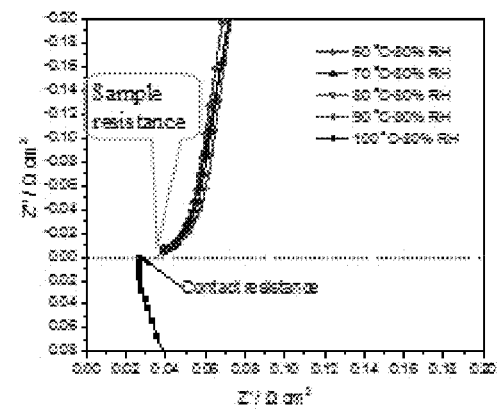
FIG. 13B is an electrical impedance spectroscopy (EIS) plot of a membrane according to an embodiment.

The ceramic membrane 108 used for the test was formed by two-time vacuum coating and subsequent sintering. NiO-promoted YSZ of 200 nm particle size and YSZ of 50 nm particle sizes were used for first and second coating respectively. The coated sample was sintered at 750° under a controlled gas environment. The ionic conductivity is measured using electrochemical impedance spectroscopy (EIS) technique in an environmental chamber. The test setup is illustrated in FIG. 13A. The ceramic coating 108 is wetted by 50 wt. % KOH solution and then, a bare porous Ni sheet 100 is attached to the ceramic coating 108, which simulates the membrane electrode assembly 1300 in electrochemical conversion. The membrane electrode assembly 1300 is wrapped in carbon paper cover sheet 128. EIS plots of a membrane sample measured at different temperatures in 80% RH are shown in FIG. 13B. This membrane 108 was prepared on a porous Ni support sheet 100 of 47 um thickness and 42% porosity with the coating loading of 4.3 mg/cm$^2$. In an EIS plot, the impedance line is extrapolated to x-axis and the extrapolated value of the real impedance where the imaginary response is zero (Z' or R at Z"=0) is then taken as the resistance of the membrane 108. All the EIS plots tend to converge into a single line, which suggests that the resistance is not much affected by temperature over the range of 60 to 100° C. tested. By subtracting the contact resistance, the resulting membrane area-specific resistance (ASR) is around 0.014 Ohm cm$^2$.

To confirm the impact of temperature on resistance, the EIS test is conducted with another membrane (#20180221-7). To exclude the complication of the possible dry spots in the ceramic/Ni sheet contacting area to the measurements, the Ni support sheet/ceramic coating/Ni cover sheet assembly 1300 is immersed in the KOH solution prior to the test to assure that both the ceramic pores and the Ni pores are wetted. The contact resistance of two fully wet Ni sheets is first checked. It is found that the fully-wetted Ni sheets exhibit the same value as the previous two dry Ni sheets (around 0.026 Ohm $cm^2$). The ASR values at different temperatures after subtracting the contact resistance from the measured number are listed in Table 3 below. The ASR increases slightly with temperature over the range of 60-100° C. The resistance value 0.043-0.033 Ohm $cm^2$ is slightly higher than 0.014-ohm $cm^2$ obtained with the first sample. The second membrane sample was coated on a Ni support having a 47 um thickness and 38% porosity with a coating loading of 2.8 $g/cm^2$. The same coating materials were used. The difference in ASR is attributed to detailed membrane structures that could vary among the samples prepared on different support porosity and/or coating conditions.

TABLE 3

ASR of membrane # 20180221-7 in 80% RH (2.8 $mg/cm^2$ coating)

| Temperature (° C.) | ASR (Ohm $cm^2$) |
|---|---|
| 60 | 0.043 |
| 70 | 0.041 |
| 80 | 0.037 |
| 90 | 0.034 |
| 100 | 0.033 |

Table 4 provides data for three sheets coated in different ways. Sheet 1582 is portioned into 15 of 3 cm×5 cm coating zones. Sheet 1460 is coated in one zone of 20 cm×20 cm. Sheet 1854 is partitioned into 6, 5 cm×10 cm coating zones. Three coating solutions are prepared with 200 nm yttria-stabilized zirconia (YSZ) pre-doped with 1M Ni nitrate solution, 50 nm YSZ pre-doped with 0.25M Ni nitrate solution, and 50 nm ceria doped with Co and Sm. Two layers of coating are laid down on sheets 1582 and 1460 by vacuum filtering with the 200 nm Ni—YSZ first and the 50 nm Ni—YSZ next, while only one-layer coating is laid down on sheet 1854 with CoSm-ceria. The solution volumes used for the coatings are listed in Table 4. The coated sheets are sintered in a continuous tunnel furnace in hydrogen gas at 750° C. Two 3 cm×5 cm coupons are sampled from each sheet for immobilization of KOH electrolyte. The KOH-filled ceramic membrane is characterized for areal-specific resistance (ASR) with the measurement technique described in the above examples. ASR values are measured at 50 and 90° C. At each temperature, relative humidity (RH) is gradually increased from 50 to 95%. The results are summarized in Table 4. The variance in ASU at 50° C. can be significant among different coupons and at different RH. At 90° C. and RH≥70%, all the membrane coupons reach ASU less 10 mΩ·$cm^2$.

TABLE 4

Ceramic coatings made on 21 m × 21 cm porous Ni sheets and their conductivity

| Ni sheets ID | 1582 | 1460 | 1854 |
|---|---|---|---|
| Average thickness, um | 45.3 | 45.2 | 42.8 |
| Porosity, % | 42.7 | 39.4 | 37.8 |
| No of coating zone | 15 | 1 | 6 |
| Area of each coating zone, $cm^2$ | 15 | 400 | 50 |
| First layer of coating | | | |
| Solid material | 1M Ni-YSZ 200 nm | 1M Ni-YSZ 200 nm | SmCo-ceria, 200 nm |
| Solid loading, wt. % | 1.0 | 1.0 | 0.5 |
| Solution volume, ml | 160 | 160 | 160 |
| Volume loading, $cc/cm^2$ | 0.71 | 0.40 | 0.53 |
| Second layer loading | | | |
| Solid material | 0.25M Ni-YSZ 50 nm | 0.25M Ni-YSZ 50 nm | |
| Solid loading, wt. % | 0.25 | 0.25 | |
| Volume, ml | 80 | 80 | |
| Volume loading, $cc/cm^2$ | 0.36 | 0.20 | |
| Average thickness, μm | 13.4 | 13.1 | 9.6 |
| STDEV, μm | 1.2 | 1.5 | 0.6 |
| Coating gain, $mg/cm^2$ | 3.2 | 1.7 | 2.3 |
| ASR measured at different conditions, mΩ·$cm^2$ | | | |
| Coupon No. sampled | 2 / 4 | 2 / 5 | 2 / 4 |
| At 50° C.: RH = 50%, 70%, 85% → 95% | 42 to 8 / 21 to 11 | 96 to 75 / 75 to 44 | 28 to 8 / 46 to 40 |
| At 90° C.: RH = 50%, 70%, 85% → 95% | 28 to 10 / 18 to 6 | 75 to 8 / 45 to 4 | 38 to 3 / 33 to 6 |

Example IV. Scale-Up of the Ceramic/Metal Sheet Membrane Separator

Scale-up of the ceramic/metal sheet membrane is demonstrated by making coatings on 21×21 cm porous Ni sheets.

Example V. Water Electrolysis with Ceramic-Coated Porous Ni Sheet Electrodes

Figure 14:
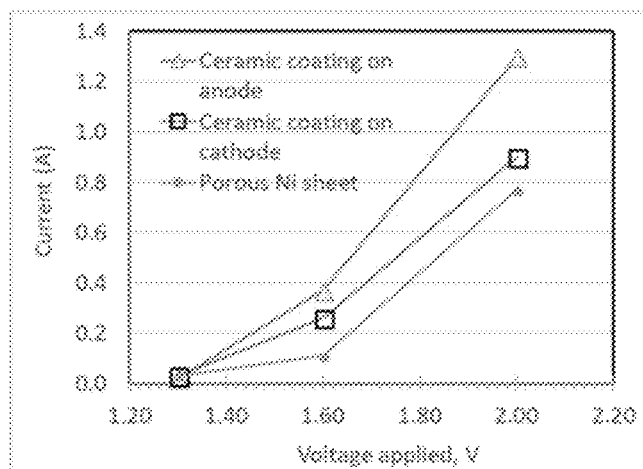
FIG. 14 is a plot illustrating the water electrolysis with ceramic coated porous nickel sheet electrodes according to an embodiment.

Water electrolysis was tested using the ceramic coated porous Ni sheet as an electrode. The ceramic coating was prepared by depositing 200 nm YSZ particles on a porous Ni support sheet of about 30% porosity and 50 μm thickness and sintering at 750° C. under a controlled gas environment. The coating layer thickness is about 13 μm. The ceramic/Ni sheet is clamped together with a bare Ni sheet and tested as described in the above example. The pair is immersed in 30 wt. % KOH solution at 95° C. Upon application of voltage>1.3V, gases are produced at the two electrodes 104, 106. After electrolysis is stabilized (typically, within 15 min), the current is recorded for comparison in FIG. 14. The ceramic/coated Ni sheet as cathode and anode is compared to the bare Ni sheet. For all three pairs of the electrode assembly, there is no measurable current at 1.3V, the current becomes significant at 1.6V and rapidly increases as the voltage is raised to 2.0V. At the same voltage, the current with ceramic coated Ni sheet as an anode is consistently higher than as a cathode. The current with the ceramic-coated Ni sheet as cathode is consistently higher than the bare Ni sheet electrode. The ceramic coating on the Ni sheet is intact after the tests. The results demonstrate applicability of the ceramic-coated Ni sheet as an electrode.

Figure 15A:
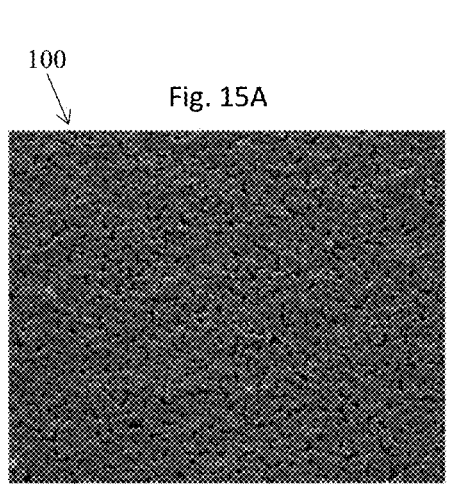
FIGS. 15A-15D are SEM micrographs illustrating the synthesis of nano molybdenum nitride catalyst particles inside pores of the nickel sheet according to an embodiment.
Figure 15B:
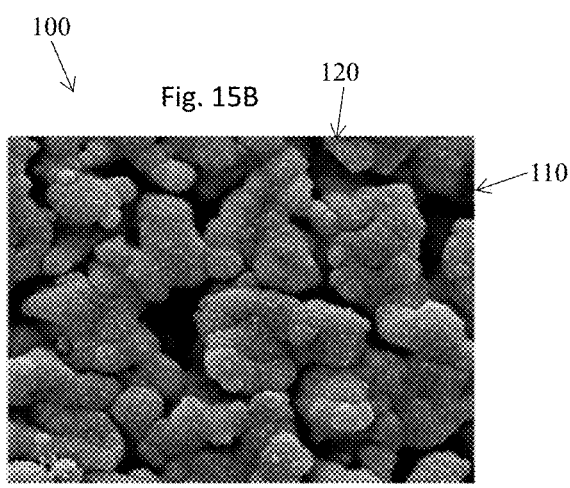
Figure 15C:
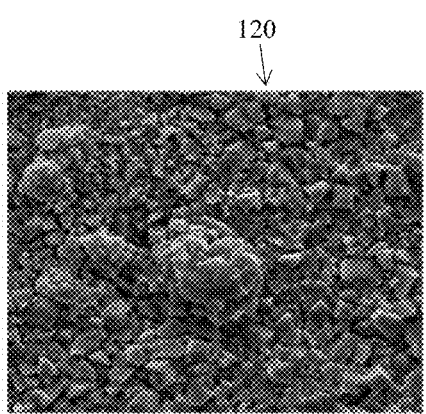
Figure 15D:
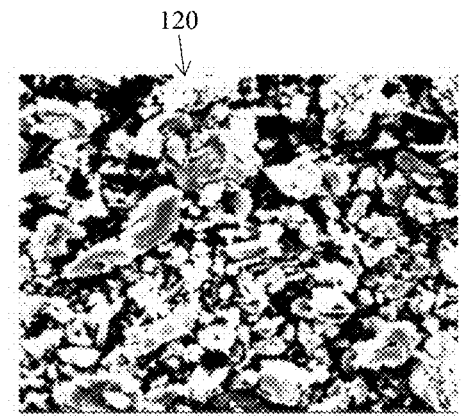

Example VI. Incorporation of Nano-Catalyst Particles Inside Pores of Porous Metal Sheets Molybdenum nitride is an active catalyst for electrochemical reactions and thermo-catalytic reactions. Nano-sized molybdenum nitride catalysts 120 are loaded inside pores 110 of the porous Ni sheet 100 by gas/solid chemical reactions. First, a porous Ni sheet 100 of about 50 um thickness and 33% porosity is impregnated with 0.2M of ammonium molybdate tetrahydrate solution. The excess solution on the Ni sheet surface is removed and the wetted sheet is dried. Then, in-situ nano-particle growth is conducted by heating the impregnated Ni sheet inside a reactor under a continuous flow of 3% $H_2$ in $N_2$. The reactor is heated at 10° C./min to 600° C. and held 1 h at 600° C. For comparison purposes, ammonium molybdate tetrahydrate powder was spread on the same porous Ni sheet 100 and on a ceramic plate and heated under the same conditions. The resulting samples are analyzed by electron scanning microscopy. At low magnification, FIG. 15A shows that the exterior surface of the porous Ni sheet 100 looks same as the bare Ni sheet. Under high magnification, growth of nano-sized molybdenum nitride particles 120 on the metallic Ni grain surface is evident (FIG. 15B). The particle size is about 10-20 nm. The micro-pores 110 among the metallic grains are intact. The nano-catalyst loading is about 0.9 mg/cm$^2$. By comparison, catalyst crystals 120 of a few micrometers (FIG. 15C) are formed from the precursor powder spread on the exterior surface of the porous Ni sheet 100. Much larger crystals (FIG. 15D) are formed from the precursor powder deposited on a dense alumina plate. The results demonstrate the feasibility of in situ synthesis of nano-sized catalyst particles 120 inside the pores of the porous Ni sheet and stabilization of the nano-catalyst particles 120 by the microporous metal support sheet.

Example VII. Growth of Carbon Nanotubes Inside Pores of Porous Metal Sheets

Carbon nanotubes (CNT) are known to have a high aspect ratio and large specific surface area. CNTs have been reported as having some unique catalytic activities for electrochemical reactions. In an embodiment, CNTs are loaded into pores of the porous Ni sheet by in situ catalytic chemical vapor deposition. The porous Ni sheet 100 of about 35% porosity is impregnated with 0.1M transitional metal nitrate ethanol solution. After drying, the impregnated sample is loaded in a reactor and heated under a temperature profile in continuous gas flow. The reactor is purged with nitrogen gas for 15 min and then, the feed gas is switched to hydrogen. The reactor is heated to 650° C. at 10° C./min in hydrogen flow. When the reactor reaches 650° C., the feed gas is switched to nitrogen. After the reactor is purged with nitrogen gas for about 4 min, ethanol vapor is introduced into the reactor. The chemical vapor deposition in ethanol/nitrogen gas flow is conducted for about 10 min. Then, introduction of ethanol vapor is turned off and the reactor is cooled down. The samples are unloaded from the reactor when they are cooled below 300° C.

Figure 16A:
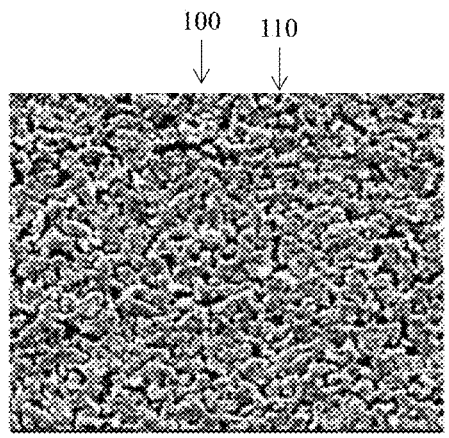
FIG. 16A-16F are SEM micrographs illustrating the growth of carbon nanotubes inside pores of a nickel sheet according to an embodiment.
Figure 16B:
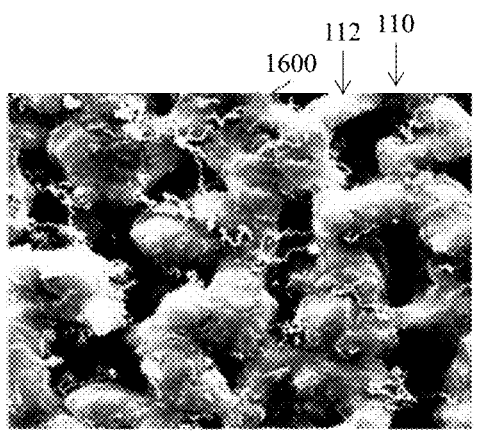
Figure 16C:
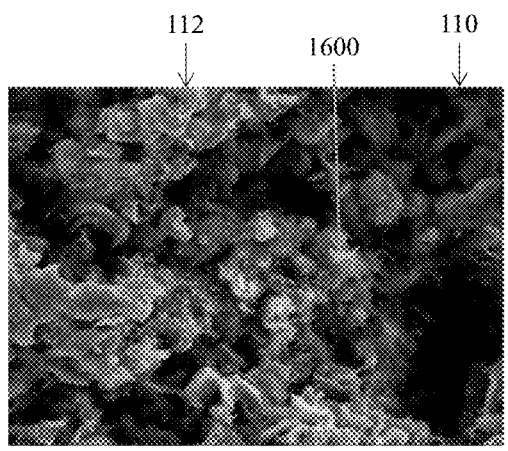
Figure 16D:
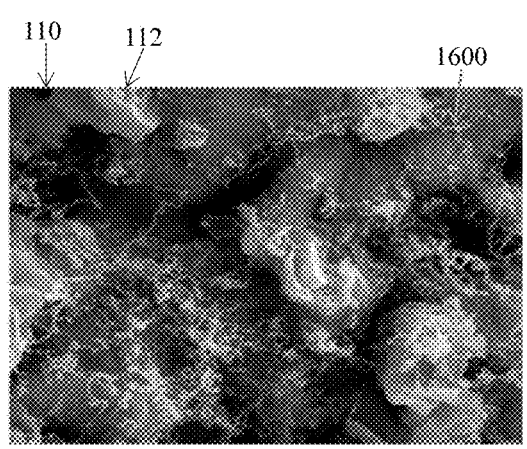
Figure 16E:
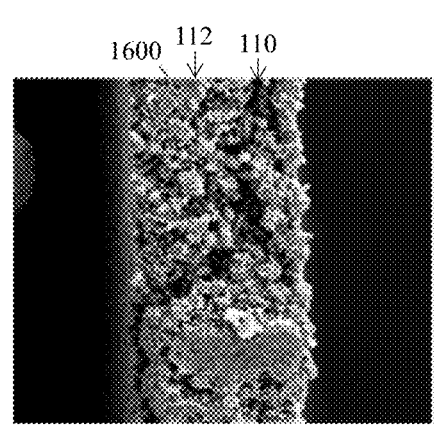
Figure 16F:
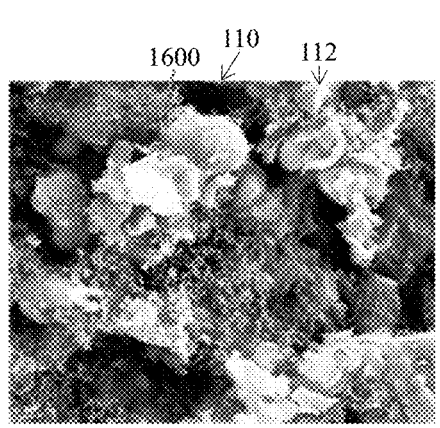

The Ni sheet 100 turns from greyish metallic to black in color. The sheet 100 remains flat and is as flexible as the bare Ni sheet. Formation of CNTs 1600 inside the pores 110 is revealed by SEM analysis. FIG. 16 shows CNT 1600 growth on the three Ni sheets 100 impregnated with respective Fe, Co, and Ni catalysts. The CNT 1600 loading in the sheet 100 is about 1 mg/cm2. On the exterior surface of the Fe-catalyzed sheet (Fe—Ni sheet) 100, the surface pore structures before and after CNT growth look similar at low magnification (FIG. 16A). Individual CNT 1600 grown out of the metallic grain surface 112 is evident at high magnification (FIG. 16B). The CNT size is about 50-100 nm diameter and several micrometers in length. The Co-catalyzed Ni sheet 110 is fractured to look at CNT growth inside the sheet 100. FIGS. 16C and 16D show extensive presence of CNTs 1600 inside the pores 110. The tubes 1600 are tangled together due to confinement inside the pores 110. Presence of CNTs 1600 throughout the sheet thickness is shown by the Ni-catalyzed Ni sheet (FIG. 16E). The tube diameter looks to be about 30-50 nm in diameter (FIG. 16F). There is also some coke or graphitic flakes formed in these samples. The sizes and yield of the CNTs 1600 can be optimized for specific application by adjusting catalyst properties (size, metal, loading level) and CVD conditions (temperature, time, carbon precursor concentration, etc.). This example demonstrates the feasibility of growing carbon nanotubes 1600 inside pores 110 of the Ni sheet 100 while keeping the networked porous structures 102 inside the sheet intact 100. Other nano-structures such as graphene may be grown inside the pores by chemical reaction processes as well.

Example VIII. Growth of Nano-Metallic Particles in Continuous Membrane Reactor

Figure 17:
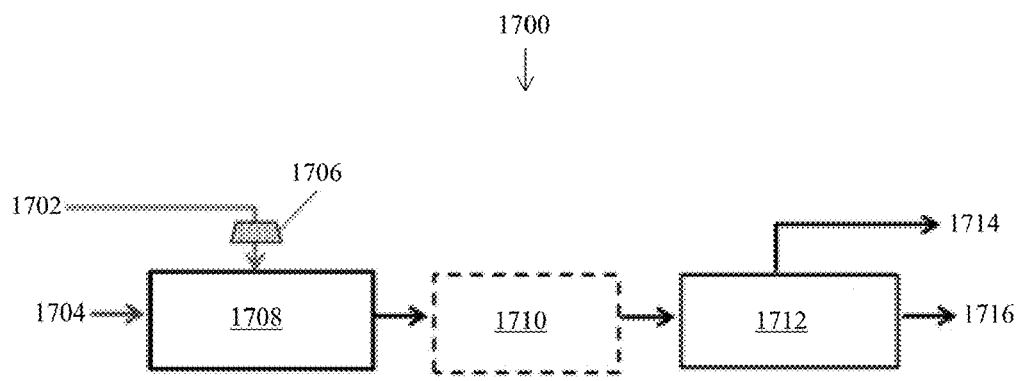
FIG. 17 is a schematic illustration of a membrane reactor for continuous synthesis of nano metallic particles according to an embodiment.

Inexpensive transition metal catalysts (Fe, Ni, Co, Cu, etc.) are desired for many catalytic reactions. Catalytic activity typically increases with decreasing the particle size. Availability of nanosized transition metals from commercial sources is scarce. In an embodiment, a membrane reactor method 1700, illustrated in FIG. 17, is developed and used to produce metallic particles 1716 of small sizes through liquid-phase reactions. With Fe as an example, iron ions in a water solution are reduced by sodium boron hydride to metallic iron:

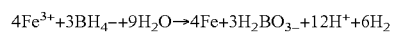

$$4Fe^{3+}+3BH_4^-+9H_2O \rightarrow 4Fe+3H_2BO_3^-+12H^++6H_2$$

The iron ion solution can be made from iron chloride or nitrate. In a first step 1702, the metal, such as iron, precursor is provided to a membrane reactor 1708 via a pressure pulse generator 1706. In a second step 1704, which may occur simultaneously with the first step 1702, a reducing agent is provided to the membrane reactor. In an embodiment, a sweep fluid is provided with the reducing agent. The iron solution contacts the reducing agent inside the membrane reactor 1708, where the iron solution is injected into a sweep fluid containing a reducing agent through a membrane as nano-jets. The nano-jets rapidly react with the reducing agent to form nanosized metallic particles. The nanosized metallic particles are swept out of the membrane channel upon its formation. When an aqueous metal ion solution is used, a hydrophobic membrane having pore sizes ranging from tens to hundreds of nanometers is used to produce the nano-jets under pressure. The injection pressure may be pulsed to produce discrete nano-jets via the pressure pulse generator 1706. The reacted stream may be rapidly cooled down to prevent agglomeration of the nano-particles, step 1710. The nano-particles 1716 may be separated from the solution by use of a magnetic field, because the nano-transition metal particles 1716 are typically magnetic, step 1712. The separated fluid is recycled to be used again, step 1714.

Figures 18A, 18B, 18C:
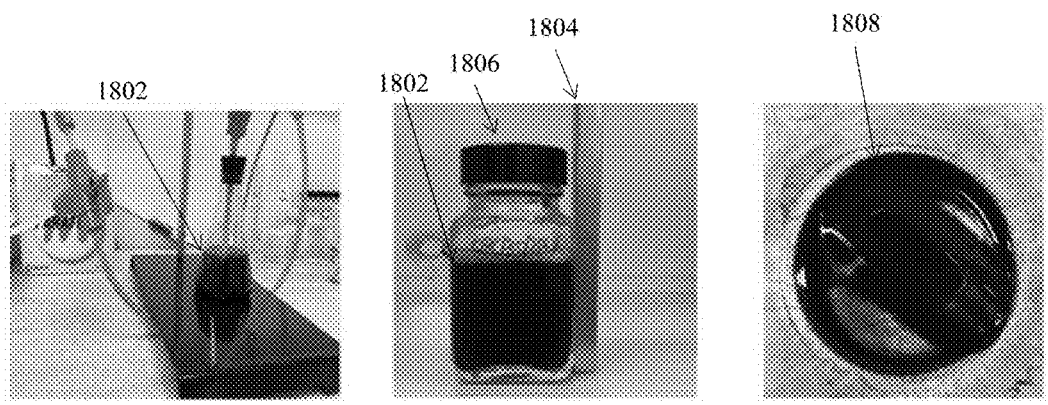
FIGS. 18A-18C are photographs illustrating nanosized iron particle slurry produced from the membrane reactor illustrated in FIG. 17.

The produced Fe particles 1716 are so small that the reactor effluent 1802 looks homogeneous (FIG. 18A). The small particles 1716 are difficult to separate from the solution by use of conventional methods, such as centrifugation and filtering. Magnetic separation is found to be simple and effective. As shown in FIG. 18B, a magnetic rod 1804 is placed on the wall of the container 1806. The nano-particles 1716 are attracted toward the magnetic 1804 rod and become segregated from the solution. By removing the solution, a concentrated nano-Fe slurry 1808 is obtained (FIG. 18C), which can be used as an electrode catalyst.

Figures 19A, 19B, 19C:
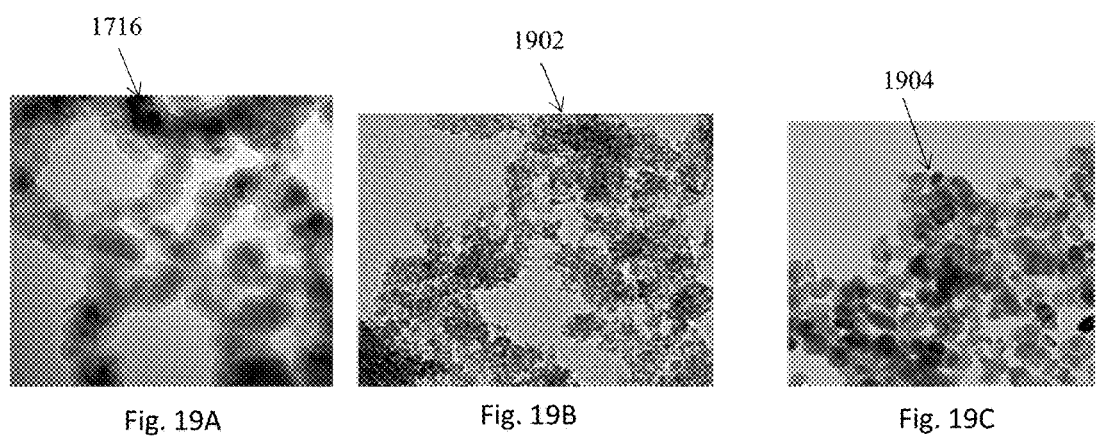
FIG. 19A-19C are TEM micrographs of nanosized iron particles produced according to an embodiment compared nanosized iron oxide particles made by conventional techniques.

The size of the produced nano-Fe particles 1716 is analyzed by transmission electron microscopy (TEM). FIG. 19A shows discrete particles 1716 of about 15-20 nm. Iron hydroxide particles 1902 as small as 5-10 nm (FIG. 19B) can be prepared by use of the precipitation technique. However, the particles rapidly grow once the iron hydroxide 1902 is calcined into iron oxide 1904. Even at a moderate calcination temperature, such as 350° C., the iron oxide particle size becomes 30-80 nm (FIG. 19C). The particle size will further grow if the iron oxide 1902 is reduced into metallic particles.

The membrane reactor 1708 may use a continuous process with nano-metal productivity as high as 5 kg/m$^2$/h. The process 1700 provides flexibility to control the particle size and composition. Single metal nano-particles (Fe, Ni, Co, Cu) 1716 may be produced by feeding a single metal ionic solution, while metallic alloy particles can be made by feeding mixed ionic solutions. Since the metal chloride solutions are fully miscible in each other, the particles 1716 of multi-metal elements can be made over a wide range of composition. For example, an FeCo alloy can be made essentially from 100% Fe to 0% Fe. The particle size can be controlled by the pore structures 102 and surface chemistry of the membrane 108 as well as the reaction conditions. The reaction conditions include: the feed rate, temperature, and residence time. The membrane 108 determines the size, shape, surface distribution, and frequency of the nano-jets. Table 5 summarizes several runs of nano-Fe synthesis in the membrane reactor 1708. Different productivity and solid loading in the reactor effluent 1802 can be obtained by changing the feed concentration, feed flow rate, and sweep flow rate.

TABLE 5

Membrane reactor runs for synthesis of nano-Fe catalyst (2 cm × 10 cm membrane)

| | Run ID # | | | | | |
|---|---|---|---|---|---|---|
| | Fe (#1) | Fe (#2) | Fe (#3) | Fe (#4) | Fe (#5) | Fe (#7) |
| Feed concentration, M | 1 | 1 | 1 | 1 | 0.5 | 0.5 |
| Feed flow rate, cc/min | 1.50 | 1.50 | 0.80 | 0.80 | 0.80 | 0.80 |
| Sweep flow, cc/min | 15 | 15 | 15 | 15 | 15 | 20 |
| Product sample | | | | | | |
| Nano metal output, g/h | 5.0 | 5.0 | 2.7 | 2.7 | 1.3 | 1.3 |
| Solid loading, g/g | 0.56% | 0.56% | 0.30% | 0.30% | 0.15% | 0.11% |

Example IX. Electrochemical Production of Ammonia from Water and Nitrogen

Figure 20:
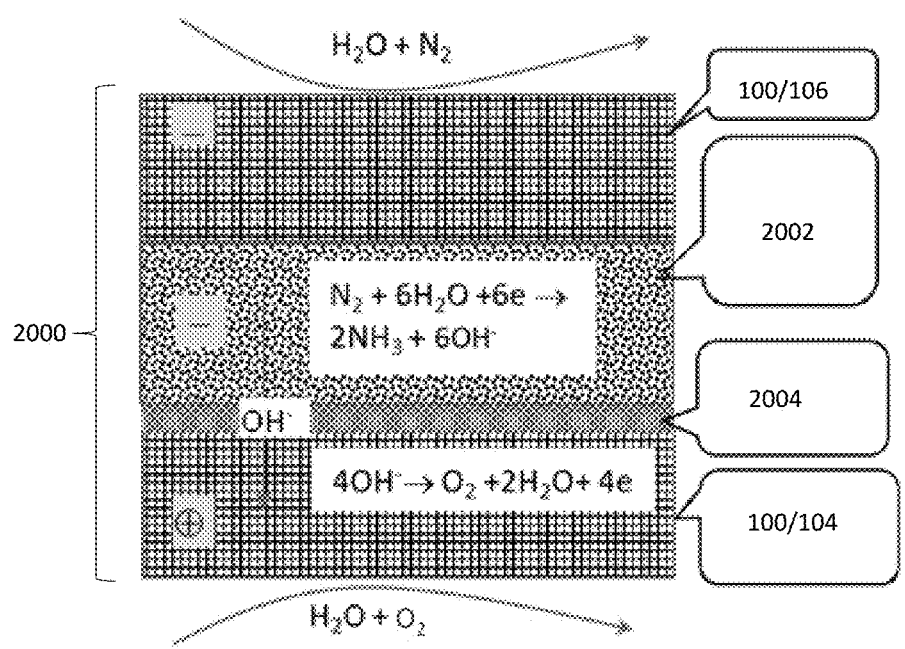
FIG. 20 is a schematic illustration of an electrode assembly to produce ammonia from water and nitrogen according to an embodiment.

The ceramic-coated porous Ni sheet as described in the previous example is used as a membrane separator 108 in the membrane electrode assembly (MEA) 2000 illustrated in FIG. 20 for production of ammonia from water vapor and nitrogen gas. A catalyst paste is prepared by ball-milling of nano-iron oxide (20-40 m) powder and carbon black in deionized water at weight ratios of iron oxide/carbon=5 and iron oxide/water=1/6. In an embodiment, 0.5 cc of the paste is applied onto another porous Ni sheet of about 50 μm thickness in a 2.7 cm×4.7 cm area. The paste 2002 is spread uniformly on the sheet 100. After the paste 200 is slightly dried, the pasted surface of the Ni sheet is deposited on the ceramic coating 2004 and the two sheets 100 are pressed together. The KOH solution is deposited on the porous metal sheet surface to fill the pores 110 of the Ni sheet 100. The excess solution on the surface is wiped out by use of clean room cloth.

The MEA 2000 is loaded into a test cell. The test cell is placed inside an oven. The porous Ni sheet with ceramic coating is positively charged and functions as anode 104, while the porous Ni sheet with the catalyst paste is negatively charged as cathode 106. If there is no short-circuit, a humid nitrogen gas flow is introduced to both the anode 104 and cathode 106 sides under nearly atmospheric pressure. The humid nitrogen gas flow in the cathode 104 provides water and nitrogen molecules as reactants. In the cathode catalyst layer 106, nitrogen and water molecules react with electrons to produce ammonia molecules and hydroxide ions. The hydroxide ions diffuse across the ceramic membrane layer 2004 and are oxidized into oxygen and water molecules in the porous Ni sheet anode 104.

Figure 21:
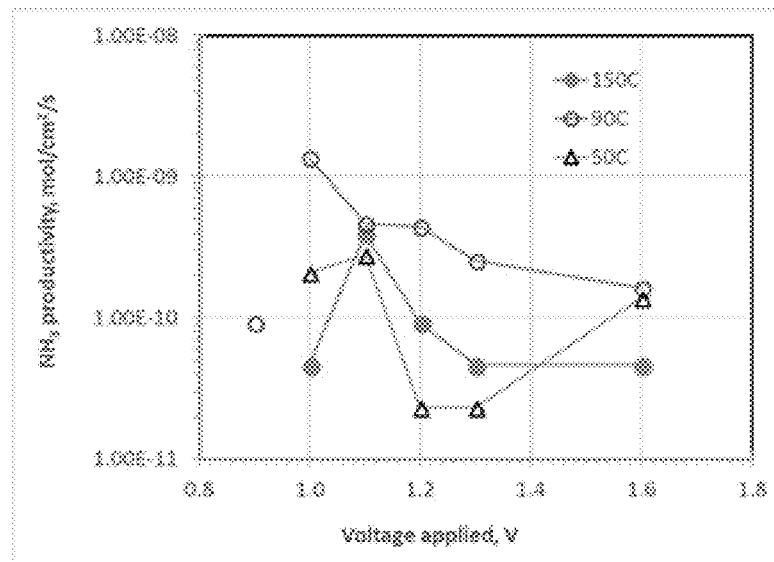
FIG. 21 is a plot illustrating the ammonia productivity at different voltages and temperatures with porous nickel sheet electrodes according to an embodiment.

The reactor effluents are scrubbed with a dilute $H_2SO_4$ solution having a pH between 4 and 6, such as about 4.7. The presence of ammonia is analyzed using an ammonium ion-selected electrode. The reaction tests are conducted at different voltages under a constant temperature. The results are summarized in FIG. 21. At each voltage applied, the reaction is run about 30 min. It appears that there is an optimum voltage for ammonia production. The voltage should be high enough to overcome the thermodynamic equilibrium limit. A side reaction may prevail over the ammonia formation if the voltage exceeds the optimum. The impact of temperature on ammonia productivity is complicated by both side reactions and adsorption of reactants. In general, a reaction rate increases with temperature. However, adsorption of nitrogen and/water vapor on the catalytic sites can dramatically decrease with increasing temperature.

The ammonia productivity and electrochemical efficiency can be improved by using a more active catalyst and optimizing the composition and structure of cathode and anode. The present example demonstrates the production of ammonia from water vapor and nitrogen by electrochemical reactions using MWI's porous Ni sheet electrodes under atmospheric pressure and at low temperatures, as compared to very high pressure and high temperature in thermo-catalytic synthesis of ammonia from nitrogen and hydrogen gas.

While several embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

Example X. Electrochemical Production of Ammonia from Water and Nitrogen with Different Catalysts Several different catalysts are prepared to enhance ammonia productivity in the electrochemical cell configuration as illustrated in FIG. 20. The preparation conditions and compositions of five catalysts are listed in table 6 below. The catalyst —N—Ni sheet is prepared by slightly oxidizing a porous Ni sheet, which is produced by Molecule Works Inc. as described in the previous examples, by heating the sheet in a furnace at 320° C. for about 2 h. Then, the sheet is treated in a continuous ammonia gas flow at 350° C. for 2 h. The treated sheet is unloaded after the reactor is cooled down to room temperature. The resulting sheet shows no deformation and remains as flat as the fresh sheet. Such a treatment generates nano-features on the metallic grains of the porous Ni sheet as shown by high magnification of SEM image in FIG. 22A (50,000×). It is noted that the sheet remains porous. The Atomic composition of the sheet is analyzed by Energy-Dispersion Spectroscopy (EDS). The structures of the area and spot sampled for EDS analysis are shown in FIG. 22B (500× magnification). N atoms are present in every area and spot sampled. The average composition is listed in Table 6. This sheet contains small amounts of Fe and Co. The crystal phase is measured by X-ray diffraction. The only crystal phase identified for this material is Ni, suggesting that the metal nitride exists in amorphous states or as nano-sized particles that are too small to be detected by XRD.

The Fe/C(1M) catalyst is prepared by impregnating carbon powder of BET surface area 1200 $m^2/g$ with 1M nitrate solution using the incipient wetness technique. The wet powder is dried at 150° C. overnight. The dried powder is placed inside a ceramic boat and activated in a tubular reactor in a continuous hydrogen gas flow at 400° for 2 h. The catalyst is unloaded after the reactor is cooled down to room temperature and purged with nitrogen gas. The Fe/C (2M) catalyst is prepared with the same procedure as used for Fe/C (1M) except for use of 2M iron nitrate solution for impregnation. The powder catalyst shows very uniform micro- and nano-textures under high magnification (10,000×) in FIG. 23A. No large segregated particles are seen, which indicates that iron is well dispersed in the carbon matrix. EDS analysis shows that Fe is the dominant metal element and some presence of N atom is seen as demonstrated in the sampling of different spots in FIG. 23B. $Fe_2O_3$ and Fe are identified as two major crystal phases in this catalyst.

Figure 24A:
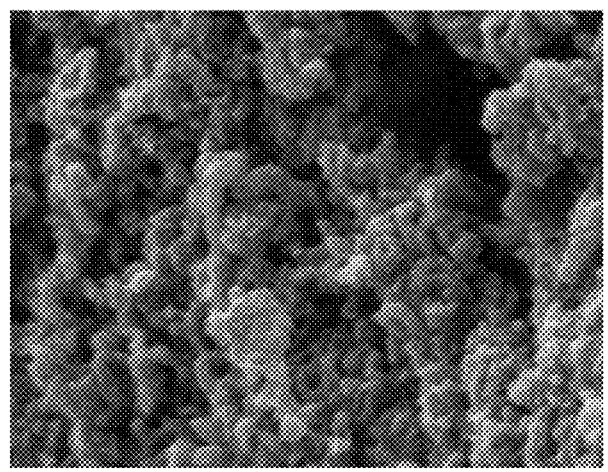
FIG. 24A is a photograph of micro- and nano-structures of N—Fe/C(1M) catalyst according to an embodiment at 50,000×.
Figure 24B:
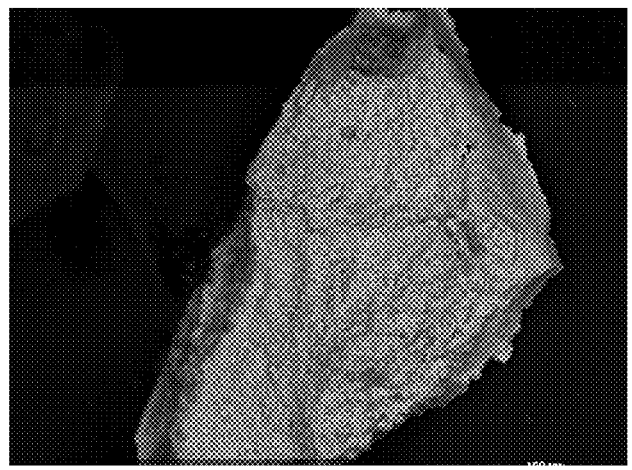
FIG. 24B is a photograph of the structures of FIG. 24A at 500× and spots sampled for atomic composition analysis.

Catalyst N—Fe/C (1M) differs from Fe/C (1M) by using a different activation process. Instead of being reduced in hydrogen gas, the Fe-impregnated carbon is treated in a tubular reactor in a continuous ammonia gas flow at 1000° C. for 2 h. Even after being treated at such a high temperature, the catalyst keeps its uniform micro- and nano-structures as shown in FIG. 24A under 50,000 magnification. At low magnification (500×, FIG. 24B) of a single particle of a few hundred μm size, a uniform texture is also seen. Significant presence of N atoms in the catalyst is measured. $Fe_2N$ is identified as the only crystal phase by XRD with broad peaks. The XRD peak width increases with crystal size and the broad peaks indicate small crystal sizes.

Figure 25A:
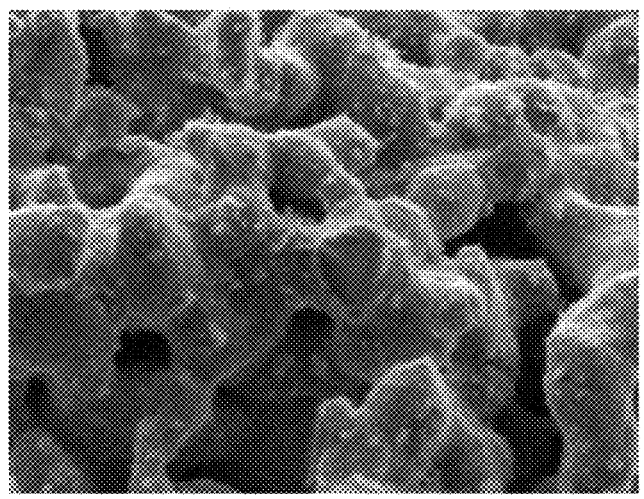
FIG. 25A is a photograph of micro- and nano-structures of N—Fe catalyst according to an embodiment at 50,000×.
Figure 25B:
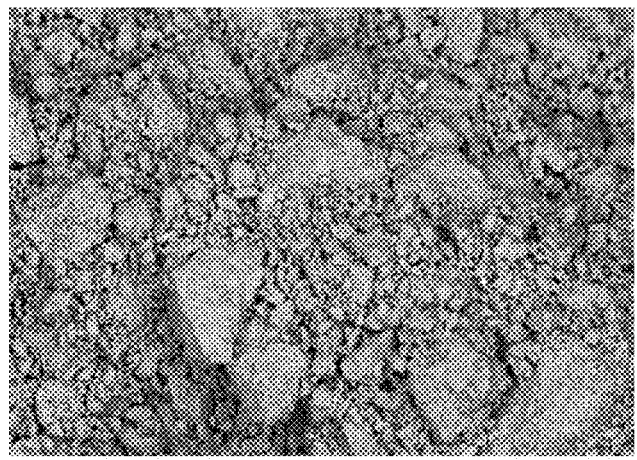
FIG. 25B is a photograph of the structures of FIG. 25A at 500× and spots sampled for atomic composition analysis.

Catalyst —N—Fe is prepared with nano-iron oxide powder (20-40 mm). The powder is heated in the tubular reactor in a continuous ammonia gas flow at 1000° C. for 2 h. The catalyst remains porous with a pore size in the hundreds of nm that can be seen under 50,000× magnification (FIG. 25A). The large crystallites are decorated with nano-particles. Low-magnification (FIG. 25B) indicates particle sizes in a range of a few to a few hundred μm. The large particles are agglomerates of much smaller crystalline particles as shown in FIG. 25A. Significant presence of N atom is shown. Fe2.15N is identified as the only crystal phase in the catalyst by XRD. The XRD peaks are also broad, indicating small crystalline sizes.

TABLE 6

Five new catalysts prepared for electrochemical ammonia production

| Name | N—Ni sheet | Fe/C (1M) | Fe/C (2M) | N—Fe/C (1M) | N—Fe |
|---|---|---|---|---|---|
| Preparation | Ni sheet calcined at 320° C. and heated in $NH_3$ gas at 350° C. | Carbon powder impregnated with 1M iron nitrate solution, dried at 150° C., activated by heating in $H_2$ at 400° C. | Carbon powder impregnated with 2M iron nitrate solution, dried at 150° C., activated by heating in $H_2$ at 400° C. | Carbon powder impregnated with 1M iron nitrate solution, dried at 150° C., activated by heating in $NH_3$ at 1000° C. | nano-iron oxide activated in $NH_3$ at 1000° C. |
| | | | Atomic composition, at % | | |
| N | 4.97 | | 3.12 | 19.5 | 19.06 |
| O | 3.69 | | 47.7 | 10.4 | 3.23 |
| Al | 0.51 | | 0.34 | 0.3 | |
| Si | 0.39 | | 2.58 | 3 | 0.22 |
| Fe | 0.75 | | 46.2 | 66.9 | 75.73 |

TABLE 6-continued

Five new catalysts prepared for electrochemical ammonia production

| Name | N—Ni sheet | Fe/C (1M) | Fe/C (2M) | N—Fe/C (1M) | N—Fe |
|---|---|---|---|---|---|
| Ni | 78.83 | | | | |
| Co | 1.12 | | | | |
| Cr | | | | | 0.24 |
| Mn | | | | | 0.52 |
| Crystal phase | Ni | | $Fe_2O_3$, Fe | $Fe_2N$ | $Fe_{2.15}N$ |

The catalyst listed in table 6 is loaded into the electrochemical cell for production of ammonia from water vapor and nitrogen. The cell configuration is the same as used in the previous example, illustrated in FIG. 20. The porous-ceramic coated Ni sheet is used as an integrated anode catalyst/membrane separator.

For the carbon-supported catalysts, Fe/C(1M), Fe/C(2M), N—Fe/C(2M), 300 mg of the catalyst powder is taken into a centrifuge tube with 10-12 zirconia media balls ($\varphi$ 3 mm). The powder is mechanically milled using a vortex mixer for 2 min in the dry state. Then, 0.5-1.5 ml of degassed deionized water is added to the blended powder and vortex mixed for 2 minutes to form a uniform catalyst paste. 3 ml of freshly-prepared 50% w/v potassium hydroxide solution is added to the catalyst slurry and vortex mixed for 2 min. The ceramic coating surface of the anode sheet is soaked with the fresh KOH solution and attached with the cathode sheet to form a single-electrochemical cell. The catalyst slurry coating on the cathode sheet is in contact with the ceramic coating. The anode and cathode sheets are pressed uniformly and firmly in the test cell to assure intimate contact.

For loading of N—Fe catalyst powder, 300 mg of the catalyst powder is mixed with 100 mg of the high surface area carbon powder. The cathode sheet is prepared and assembled with the anode sheet in the same way as described in the previous paragraph.

Loading of the nitride porous Ni sheet —N—Ni catalyst is different from the above catalyst powder. 50 mg of the high surface area carbon powder is dispersed in 0.5 ml water, added with 1-2 ml of the KOH solution, and mixed to form a carbon paste. The carbon paste is applied to top surface of the nitride Ni sheet that is placed on a clean room cloth. When the carbon is sufficiently immobilized, the carbon-coated nickel nitride sheet is transferred to the cathode plate and pressed onto the ceramic membrane coating with the carbon-coated surface.

The test cell is placed inside an oven. 100 sccm of argon gas goes through a water evaporator and enters the anode side of the test cell. 100 sccm of $H_2/N_2$ (of molar ratio=1/1) or $N_2$ gas goes through another water evaporator and is provided to the cathode side of the test cell. The cell temperature is controlled by the oven temperature. In this embodiment, the water evaporators are also placed inside the oven to assure that feed gas is humidified close to its saturation point under any testing conditions. The anode and cathode pressures can be controlled independently or maintained the same. The anode and cathode effluent are scrubbed with respective absorbers loaded with $H_2SO_4$ solution of pH=2.5. The ammonium concentration in the scrubber is analyzed. Ammonia productivity is calculated based on the analytical result and sampling conditions. The results are summarized in table 7 below.

The testing results in Table 7 are all generated at one constant temperature 90° C. The reactor pressure is operated at low pressure (either atmospheric, or 14.7 psig). For each test run, the reactor is typically started without applying any voltage to check for non-electrochemical reactions. Then, a voltage is applied to show electrochemical reaction. The cathode feed may be switched from $H_2/N_2$ to $N_2$ to assess the impact of the feed gas on the reactivity.

With the nitride Ni sheet cathode catalyst (N—Ni), ammonia productivity is increased by about five times when 1.2V is applied, which clearly shows the electrochemical reaction effects. Ammonia production from a $H_2/N_2$ feed gas without voltage could result from i) a side reaction of $H_2O$ with the catalyst N atom and/or ii) thermo-catalytic reaction of $H_2$ and $N_2$. Ammonia production from $N_2$ feed gas without voltage most likely results from the side reaction of $H_2O$ with the catalyst N atom. After the feed gas is switched from $H_2/N_2$ to $N_2$, ammonia productivity at the same voltage stays about the same at $3.9 \times 10^{-9}$ mol/(m²·s). However, ammonia productivity decreases with time on stream under constant conditions. After 290 min, productivity dropped to $5.9 \times 10^{-10}$ mol/(m²·s).

The carbon-supported Fe catalyst—Fe/C (1M) also clearly shows electrochemical reaction when 1.2 V voltage is applied. Ammonia productivity is at a level of $2.0 \times 10^{-9}$ mol/(m²·s). With another carbon supported Fe catalyst—Fe/C (2M), the electrochemical reaction shows about 4 times higher ammonia productivity than the non-electrochemical reaction and reaches $1.1 \times 10^{-9}$ mol/(m²·s). A comparison to the catalyst—Fe/C(1M) suggests that increasing the amount of Fe loading in the catalyst does not necessarily enhance ammonia productivity. Ammonia productivity does not change much when the feed gas is switched from $H_2/N_2$ to $N_2$. But, ammonia productivity decreases with time on stream.

High ammonia productivity is obtained with nitride carbon-supported Fe catalyst—N—Fe/C (2M). Electrochemical productivity at 1.2V is about 10 times that of initial non-electrochemical productivity. The productivity reaches $1.8 \times 10^{-8}$ mol/(m²·s). The productivity decreases after the feed gas is switched from $H_2/N_2$ to $N_2$ but could not be restored when the feed gas is switched back to $N_2/H_2$.

About 32 times of the electrochemical ammonia production is shown by the nitride iron catalyst—N—Fe. The ammonia productivity is as high as $5.0 \times 10^{-8}$ mol/(m²·s) at 1.2V and increases to $7.6 \times 10^{-8}$ mol/(m²·s) at 1.5V. However, the productivity decreases to $7.6 \times 10^{-10}$ mol/(m²·s) at 1.85V. The productivity decrease likely results from catalyst deactivation with time rather than voltage increase. That is, the high productivity could not be maintained by increasing voltage.

TABLE 7

Electrochemical reaction testing results of the catalysts listed in table 6

| Cathode gas | Time on stream, min | Test T, °C | Pressure, psig | Voltage, V | Current, A | Sampling time, min | $NH_3$ productivity, mol/(cm² · s) |
|---|---|---|---|---|---|---|---|
| Cathode catalyst = N—Ni sheet | | | | | | | |
| H2/N2 | 50 | 90 | 14.7 | 0 | 0 | 50 | 8.1E−10 |
| H2/N2 | 95 | 90 | 14.7 | 1.2 | 0.045 | 45 | 3.8E−09 |
| N2 | 140 | 90 | 14.7 | 1.2 | 0.043 | 45 | 3.9E−09 |
| N2 | 185 | 90 | 14.7 | 1.2 | 0.04 | 45 | 2.2E−09 |
| N2 | 215 | 90 | 14.7 | 1.2 | 0.04 | 30 | 2.8E−09 |
| N2 | 260 | 90 | 14.7 | 1.2 | 0.04 | 45 | 2.0E−09 |
| N2 | 290 | 90 | 14.7 | 1.2 | 0.043 | 30 | 5.9E−10 |
| Cathode catalyst = Fe/C (1M) | | | | | | | |
| H2/N2 | 45 | 90 | 0 | 0 | 0 | 45 | 8.4E−10 |
| H2/N2 | 90 | 90 | 0 | 1.2 | 0.115 | 45 | 2.0E−09 |
| H2/N2 | 135 | 90 | 0 | 1.2 | 0.104 | 45 | 2.1E−09 |
| H2/N2 | 180 | 90 | 0 | 1.2 | 0.104 | 45 | 1.5E−09 |
| Cathode catalyst = Fe/C (2M) | | | | | | | |
| H2/N2 | 45 | 90 | 14.7 | 0 | 0 | 45 | 2.8E−10 |
| H2/N2 | 90 | 90 | 14.7 | 1.2 | 0.105 | 45 | 1.1E−09 |
| H2/N2 | 135 | 90 | 14.7 | 1.2 | 0.101 | 45 | 5.6E−10 |
| N2 | 180 | 90 | 14.7 | 1.2 | 0.095 | 45 | 6.2E−10 |
| N2 | 225 | 90 | 14.7 | 1.2 | 0.094 | 45 | 4.5E−10 |
| N2 | 325 | 90 | 14.7 | 1.2 | 0.093 | 100 | 4.8E−10 |
| N2 | 370 | 90 | 14.7 | 1.2 | 0.092 | 45 | 2.8E−10 |
| N2 | 400 | 90 | 14.7 | 1.2 | 0.092 | 30 | 2.5E−10 |
| N2 | 430 | 90 | 14.7 | 1.2 | 0.092 | 30 | 1.7E−10 |
| Cathode catalyst = N—Fe/C (2M) | | | | | | | |
| H2/N2 | 45 | 90 | 14.7 | 0 | 0 | 45 | 1.7E−09 |
| H2/N2 | 105 | 90 | 14.7 | 1.2 | 0.027 | 60 | 1.8E−08 |
| N2 | 180 | 90 | 14.7 | 1.2 | 0.023 | 75 | 5.7E−09 |
| N2 | 225 | 90 | 14.7 | 1.2 | 0.02 | 45 | 5.1E−10 |
| H2/N2 | 270 | 90 | 14.7 | 1.2 | 0.02 | 45 | 4.5E−10 |
| Cathode catalyst = N—Fe | | | | | | | |
| H2/N2 | 45 | 90 | 14.7 | 0 | 0.000 | 45 | 1.6E−09 |
| H2/N2 | 75 | 90 | 14.7 | 1.2 | 0.324 | 30 | 5.0E−08 |
| H2/N2 | 95 | 90 | 14.7 | 1.5 | 0.385 | 20 | 7.6E−08 |
| H2/N2 | 115 | 90 | 14.7 | 1.85 | 0.440 | 20 | 7.6E−10 |

This example demonstrates that high ammonia productivity can be obtained using the electrochemical cell configuration as disclosed herein and new catalysts taught herein. The catalysts, electrochemical cell fabrication, and reactor design and operating process presented in these illustrative examples may be further optimized. It is known in catalysis and catalytic process development fields that once new catalytic chemistry and/or reaction process concepts are discovered, the catalytic reaction performances can be dramatically improved by optimizing the catalyst, reactor configuration, and process conditions.

The following references teach aspects of the fabrication of porous metal sheets, electrodes and ammonia synthesis and are hereby incorporated by reference:

RELEVANT LITERATURE

Shiming Chen, Siglinda Perathoner, Claudio Ampelli, Chalachew Mebrahtu, Dangsheng Su, and Gabriele Centi "Electrocatalytic Synthesis of Ammonia at Room Temperature and Atmospheric Pressure from Water and Nitrogen on a Carbon-Nanotube-Based Electrocatalyst" Angew. Chem. Int. Ed. 2017, 56, 2699-2703.

Stuart Licht, Baochen Cui, Baohui Wang, Fang-Fang Li, Jason Lau, Shuzhi Liu "Ammonia synthesis by Na and steam electrolysis in molten hydroxide suspensions of nanoscale Fe2O3" Science, Vol. 345, issue 6197, pp 637-640 (2014).

Liu, N. L. Canfield, and X. Li. "Thin, Porous Metal Sheets and Methods for Making the Same" U.S. Pat. No. 9,079,136 (Filed Feb. 23, 2011).

P. Millet, S. Grigoriev "Water Electrolysis Technologies" Chapter 2 in Renewable Hydrogen Technologies Production, Purification, Storage, Applications and Safety (eds.) by L. M. Gandi'A, G. Arzamendi, P. M. Die'Guez, Elsevier, 2013.

J. Cheng, J. T. Zhu, Y. Pan, and C. Lu "Sulfur-Nickel Foam as Cathode Materials for Lithium-Sulfur Batteries" ECS Electrochemistry Letters 4(2): A19-A21, 2014.

C. Yoo, H. Yoon, J. Yu, J. H. Joo, J. Kim "Apparatus for synthesizing ammonia" US 2016/0138176 A1 (May 19, 2016).

Jiri Divisek, Peter Malinowski "Diaphragm for alkaline electrolysis and process for manufacture of diaphragm" U.S. Pat. No. 4,636,291 A (Jan. 13, 1987).

Ph. Vermeiren, W. Adriansens, J. P. Moreels, R. Leysen. Chapter "The Composite Zirfon® Separator for Alkaline Water Electrolysis" in Hydrogen Power: Theoretical and Engineering Solutions (ed.) by T. O. Saetre, pp 179-184, 1997.

P. Vermeiren, J. P. Moreels, A. Claes, H. Beckers, "Electrode diaphragm electrode assembly for alkaline water electrolysers" Int J Hydrogen Energy. 34 (2009) 9305-9315.

Yongjun Leng, Guang Chen, Alfonso J. Mendoza, Timothy B. Tighe, Michael A. Hickner, and Chao-Yang Wang "Solid-State Water Electrolysis with an Alkaline Membrane" J. Am. Chem. Soc., 134 (22), pp 9054-9057, 2012.

Cecili'a Kristi'n Kjartansdo'ttir, Lars Pleth Nielsen, Per Møller. "Development of durable and efficient electrodes for large-scale alkaline water electrolysis" International Journal of Hydrogen Energy 38 (2013) 8221-8231.

Kai Zeng 1, Dongke Zhang "Recent progress in alkaline water electrolysis for hydrogen production and applications" Progress in Energy and Combustion Science 36 (2010) 307-326.

The invention claimed is:

1. An electrochemical conversion device comprising:
   a first electrode comprising a first porous metal sheet having a thickness less than 200 µm, a networked pore structure with 80% to 90% pores having pore sizes less than 5 µm, and a porosity in the range of 20 to 80%;
   a membrane separator comprising a porous layer of ceramic material disposed on the first porous metal sheet and having a thickness less than 40 µm; and
   a second electrode comprising a second porous metal sheet disposed on the membrane separator and having a thickness less than 200 µm, a networked pore structure with 80% to 90% pores having pore sizes less than 5 µm, and a porosity in the range of 20 to 80%.

2. The electrochemical conversion device of claim 1, wherein the porous layer of ceramic material has surface pore sizes less than 100 nm.

3. The electrochemical conversion device of claim 2, wherein the ceramic material comprises at least one of zirconia, yttria-stabilized zirconia, ceria, alumina, or silicon carbide.

4. The electrochemical conversion device of claim 2, wherein the ceramic material comprises 0.5-5 wt. % sintering promoters comprising nickel oxide, cobalt, manganese oxide, silica or mixtures thereof.

5. A device for the electrochemical production of ammonia comprising:
   an assembly of positively-charged electrodes comprising an electrically-conducting porous metal sheet, the electrically-conducting porous metal sheet comprising a thickness less than 200 µm, a networked pore structure with 80% to 90% of the pores having pore sizes less than 5 µm, and a porosity in the range of 20 to 80%;
   a membrane separator comprising a porous layer of ceramic material disposed on the electrically-conducting porous metal sheet and having a thickness less than 40 µm; and
   a negatively charged electrode disposed on the membrane separator and comprising a catalyst of nano-sized iron, a mixture of carbon with nano-sized iron and/or iron oxide, carbon-supported nano-sized iron, carbon supported nano-iron oxide, carbon-supported nano-iron nitride, a mixture of carbon with iron nitride, or mixtures thereof.

6. A membrane electrode structure for electrochemical reaction, comprising:
   a porous metal supporting sheet having a thickness of less than 200 µm;
   a networked pore structure comprising a plurality of pores with 80% to 90% of the pores having a pore size less than 5 µm, and a porosity in a range of 20% to 80%; and
   a porous layer of ceramic material having a thickness less than 40 µm coated on a surface of the porous metal supporting sheet.

7. The membrane electrode structure of claim 6, wherein the porous layer of ceramic material is configured to be filled with an electrolyte of specific areal resistance less than 0.1 Ωcm.

8. The membrane electrode structure of claim 7, wherein the porous layer of ceramic material includes a surface pore size of less than 100 nm.

9. The membrane electrode structure of claim 7, wherein the thickness of the porous layer of ceramic material is in a range from 6 µm to 25 µm.

10. The membrane electrode structure of claim 7, wherein the ceramic material comprises a zirconia material comprising one of zirconia and yttria-stabilized zirconia.

11. The membrane electrode structure of claim 10, wherein a crystalline grain structure of the zirconia material comprises a sintering promoter comprising at least one of nickel oxide, cobalt and silica.

12. The membrane electrode structure of claim 7, wherein the ceramic material comprises one of ceria and CoSm-stabilized ceria.

13. The membrane electrode structure of claim 7, wherein the porous layer of ceramic material is prepared by wet chemistry coating and sintering at a temperature above 500° C.

14. The membrane electrode structure of claim 7, wherein the porous metal supporting sheet comprises a nickel alloy.

15. The membrane electrode structure of claim 7, wherein the porous metal supporting sheet comprises an electrode catalyst comprising at least one of iron, cobalt and nickel.

16. The membrane electrode structure of claim 7, wherein the porous metal supporting sheet comprises an electrode catalyst comprising at least one of iron nitride or nickel nitride.

17. The membrane electrode structure of claim 7 further comprising an anodic membrane electrode assembly of an electrochemical device for water electrolysis.

18. The membrane electrode structure of claim 7 further comprising a cathodic membrane electrode assembly of an electrochemical device for water electrolysis.

19. The membrane electrode structure of claim 7 further comprising an anodic membrane electrode assembly of an electrochemical device for production of ammonia from water and nitrogen gas at a temperature in a range of 20° C. to 200° C., the electrochemical device comprising:
   an anode comprising the porous metal supporting sheet and the porous layer of ceramic material, the anode being configured to receive a flow of sweep fluid;
   an electrolyte immobilized in the networked pore structure of the porous metal supporting sheet;
   a layer of cathode catalyst disposed on the porous layer of ceramic coating; and
   a cathode disposed on the layer of cathode catalyst and configured to receive a flow of humid gas containing nitrogen.

20. The membrane electrode structure of claim 19, wherein the layer of cathode catalyst comprises at least one of carbon with nano-sized iron, cobalt or nickel.

21. The membrane electrode structure of claim 19, wherein the layer of cathode catalyst comprises at least one of carbon with iron nitride, nickel nitride or a mixture thereof.

* * * * *